US008403761B2

(12) United States Patent
Kira et al.

(10) Patent No.: US 8,403,761 B2
(45) Date of Patent: Mar. 26, 2013

(54) GAME PROGRAM, GAME APPARATUS AND GAME SYSTEM CONFIGURED TO USE REPLAY DATA TO CREATE A HIGHLIGHT SCENE

(75) Inventors: Satoshi Kira, Kyoto (JP); Toshiharu Izuno, Kyoto (JP); Yuichi Kimura, Tokyo (JP)

(73) Assignees: Nintendo Co., Ltd., Kyoto (JP); Kabushiki Kaisha Taito, Tokyo (JP)

( * ) Notice: Subject to any disclaimer, the term of this patent is extended or adjusted under 35 U.S.C. 154(b) by 629 days.

(21) Appl. No.: 12/552,609

(22) Filed: Sep. 2, 2009

(65) Prior Publication Data

US 2010/0292011 A1    Nov. 18, 2010

(30) Foreign Application Priority Data

May 18, 2009    (JP) .................. 2009-119773

(51) Int. Cl.
*A63F 9/24* (2006.01)
*G06F 19/00* (2006.01)
(52) U.S. Cl. ........................................ 463/43
(58) Field of Classification Search ............... 463/43
See application file for complete search history.

(56) References Cited

U.S. PATENT DOCUMENTS

| 2003/0041117 | A1* | 2/2003 | Dozier et al. ................. 709/217 |
| 2004/0125148 | A1* | 7/2004 | Pea et al. ...................... 345/802 |
| 2008/0154908 | A1* | 6/2008 | Datar et al. .................... 707/10 |
| 2009/0162024 | A1* | 6/2009 | Bradicich et al. ............... 386/52 |

FOREIGN PATENT DOCUMENTS

| JP | 2004-041645 | 2/2004 |
| JP | 2005-245795 | 9/2005 |
| JP | 2006-518063 | 8/2006 |
| JP | 2008-029885 | 2/2008 |

OTHER PUBLICATIONS

"Live for Speed". Wikipedia.org. Online. Accessed via the Internet. Accessed Jan. 24, 2012. <URL: http://en.wikipedia.org/wiki/Live_for_Speed>.*
Scawen. "LFS S2—Patch Z". Live for Speed Forum. Online. Jul. 2, 2008. Accessed via the Internet. Accessed Jan. 24, 2012. <URL: http://www.lfsforum.net/showthread.php?p=849872>.*
Pullman, William. "How to Save a Replay for Live for Speed". eHow.com. Online. Accessed via the Internet. Accessed Jan. 24, 2012. <URL: http://www.ehow.com/how_10043643_save-replay-live-speed.html>.*

(Continued)

*Primary Examiner* — Dmitry Suhol
*Assistant Examiner* — Carl V Larsen
(74) *Attorney, Agent, or Firm* — Nixon & Vanderhye P.C.

(57) ABSTRACT

A game apparatus stores a history in relation to a game operation as replay data in a memory, and displays a replay image on the basis of the stored replay data on a monitor. A CPU of the game apparatus creates highlight scene positional information indicating a at least temporal position of a highlight scene in the replay image on the basis of a highlight scene position designating operation, stores the created highlight scene positional information by bringing it into association with the replay data in the memory, and displays a time-line image representing a temporal position of the highlight scene in the replay image on the monitor on the basis of the highlight scene positional information when the replay image is displayed on the monitor.

11 Claims, 19 Drawing Sheets

OTHER PUBLICATIONS

"Warcraft III: Frozen Throne Frequently Asked Questions". Diablo3. nl. Online. Accessed via the Internet. Accessed Jan. 24, 2012. <URL: http://www.diablo3.nl/war3x/faq.shtml>.*

"Warcraft III Expansion: The Frozen Throne" Amazon.com. Online. Accessed via the Internet. Accessed Jan. 24, 2012. <URL: http://www.amazon.com/WarCraft-III-Expansion-Frozen-Throne-Mac/dp/B00008ODBQ/>.*

SteveSchwindt. "Warcraft III Commentary // NE vs NE (lvl 32) on Gnoll Wood". YouTube.com. Online. Accessed via the Internet. Accessed Jan. 24, 2012. <URL: http://www.youtube.com/watch?v=SUeXUCniyy4>.* whywouldifoolyou. "Warcraft 3 Frozen Throne Human vs. Undead (Computer Insane) 1v1 Rush Tower Strategy". YouTube.com. Online. Accessed via the Internet. Accessed Jan. 24, 2012. <URL: Warcraft 3 Frozen Throne Human vs. Undead (Computer Insane) 1v1 Rush Tower Strategy>.*

"Can I get a replay in Warcraft 3: TFT from a saved game?" gaming.stackexchange.com webpage. Online. Accessed Aug. 23, 2012. Accessed via the Internet. <URL:http://gaming.stackexchange.com/questions/27371/can-i-get-a-replay-in-warcraft-3-tft-from-a-saved-game>.*

""WarCraft III replays from all the top players in the world"." Replayers.com webpage. Online. Feb. 23, 2008. Accessed Aug. 23, 2012. Accessed via the Internet. <URL: http://web.archive.org/web/20080223234842/http://tft.replayers.com/?action=submit>.*

* cited by examiner (A)

(B)

(A)

(B)

(A)

(B)

GAME PROGRAM, GAME APPARATUS AND GAME SYSTEM CONFIGURED TO USE REPLAY DATA TO CREATE A HIGHLIGHT SCENE

CROSS REFERENCE OF RELATED APPLICATION

The disclosure of Japanese Patent Application No. 2009-119773 is incorporated herein by reference.

BACKGROUND OF THE INVENTION

1. Field of the Invention

The present invention relates to a game program, a game apparatus and a game system. More specifically, the present invention relates to a game program, a game apparatus and a game system which store a history in relation to a game operation by a player as replay data, and thereafter reproduce a play image performed by the player on the basis of the replay data.

2. Description of the Related Art

Replay data is exchanged between players in order to teach how to clear a game with each other and be proud of their high scores with each other, for example. Thereupon, a player of one side who provides replay data has a need to clearly show a "highlight scene" of his or her own game play in a play image to be reproduced by an opponent of the other side who receives the replay data, that is, a replay image.

As a background art in relation to the replay, there are Japanese Patent Application Laid-Open No. 2004-41645 (Patent Document 1) which discloses an edits (viewpoint selection, etc.) of a replay image and so on, and Japanese Patent Application Laid-Open No. 2005-245795 (Patent Document 2) which discloses a viewpoint control of a replay image and a display control of various markers (character designating marker, etc.). On the other hand, as a background art in relation to a highlight scene, Japanese Unexamined Patent Application Publication 2006-518063 (Patent Document 3) which discloses setting of a book mark and a watch point to a media stream is known. Furthermore, Japanese Patent Application Laid-Open No. 2008-29885 (Patent Document 4) discloses a communication of replay data.

However, in the either background arts, it was impossible to make an opponent who receives replay data observe a highlight scene of the replay image.

For example, it is conceivable that the watch point of the Patent Document 3 is set to the replay data of the Patent Documents 1, 2 or 4. However, this watch point is composed of a watch point trigger (if . . . ) and a watch point action (then . . . ), and is mere general control information which executes a predetermined action when a predetermined trigger occurs in association with a media reproduction, such as a movie.

Furthermore, assuming that by setting the watch point to the replay data, the "highlight scene instruction marker" is displayed in a replay image by regarding the "highlight scene" as a trigger, the instruction marker of this kind is displayed only after the "highlight scene" appears. On the other hand, since the player who receives the replay data does not know at which timing the "highlight scene" appears, unless the player looks carefully the replay image from the beginning thoroughly, he or she may miss the "highlight scene". In addition, if a movement of the viewpoint in the replay image is possible, when the timing of the "highlight scene" has come in a state that the viewpoint is at a position far away from the "highlight scene" (that is, when the "highlight scene" is out of the visual range), it becomes difficult to display a marker, resulting in a miss of the "highlight scene" by the player.

SUMMARY OF THE INVENTION

Therefore, it is a primary object of the present invention to provide a novel game program, game apparatus and game system.

Another object of the present invention is to provide a game program, a game apparatus and a game system which are able to make a player perceive a highlight scene of a replay image.

The present invention employs following features in order to solve the above-described problems. It should be noted that reference numerals inside the parentheses and supplemental remarks show one example of a corresponding relationship with embodiments described later for easy understanding of the present invention, and do not limit the present invention.

A first invention is a game program causing a computer of a game apparatus storing a history in relation to a game operation by a player as replay data in a memory and displaying a replay image on the basis of the replay data on a screen to function as: a creating means for creating highlight scene positional information indicating at least a temporal position of a highlight scene in the replay image on the basis of a highlight scene position designating operation by the player; a storing means for storing the highlight scene positional information created by the creating means by bringing it into associated with the replay data in the memory; and a highlight scene positional image displaying means for displaying a highlight scene positional image indicating a temporal position of the highlight scene in the replay image on the screen on the basis of the highlight scene positional information when the replay image is displayed on the screen.

In the first invention, a game apparatus (12) stores a history in relation to a game operation by a player in a memory (38, 44, 42e, 46) as replay data, and displays a replay image (130b) on a screen (28) on the basis of the stored replay data. The game program causes a computer (40) of the game apparatus to function as a creating means (S35, S43, S45), a storing means (S39) and a highlight scene positional image displaying means (S84). The creating means creates highlight scene positional information indicating at least a temporal position of a highlight scene in the replay image on the basis of a highlight scene position designating operation by the player. The storing means stores the highlight scene positional information created by the creating means by bringing it into associated with the replay data in the memory. The highlight scene positional image displaying means displays a highlight scene positional image (136) indicating a temporal position of the highlight scene in the replay image on the screen on the basis of the highlight scene positional information when the replay image is displayed on the screen.

According to the first invention, by displaying the highlight scene positional image together with the replay image, it is possible to make the player perceive at least the temporal position of the highlight scene. As a result, it is possible to reduce a possibility that the opponent who receives the replay data misses the highlight scene.

A second invention is a game program according to the first invention, and the replay image is an image when at least a part of a virtual game space is viewed from an arbitrary viewpoint, and the highlight scene positional information created by the creating means further indicates a spatial position of the highlight scene in the replay image, and the game program causes the computer to further function as a viewpoint moving means for moving the viewpoint to the position of the highlight scene before start of the highlight scene on the basis of the highlight scene positional information.

In the second invention, the replay image is an image when at least a part of a virtual game space is viewed from an arbitrary viewpoint, and the highlight scene positional information further indicates a spatial position of the highlight scene in the replay image. The game program causes the computer to further function as a viewpoint moving means (S117). The viewpoint moving means moves the viewpoint to the position of the highlight scene before start of the highlight scene on the basis of the highlight scene positional information.

According to the second invention, by moving the viewpoint to the position of the highlight scene before start of the highlight scene, even if the viewpoint is far away from the highlight scene at a timing of the highlight scene, it is possible to show the highlight scene to the opponent.

Here, the highlight scene positional image displaying means further displays another highlight scene positional image (132, 132a) representing a spatial position of the highlight scene in the replay image on the basis of the highlight scene positional information. Thus, it is possible to further reduce a probability of missing the highlight scene by the opponent.

A third invention is a game program according to the first invention, and the temporal position of the highlight scene is indicated by frame specifying information of the replay image, the highlight scene position designating operation is a button push operation performed at an arbitrary timing while the replay image is displayed on the screen, and the creating means describes the frame specifying information at a time when the button push operation is performed in the highlight scene positional information (S43).

Here, the frame specifying information is a frame number indicating a reproducing order in one embodiment, but it may be a time stamp indicating a reproducing hour in another embodiment.

According to the third invention, by performing a button push operation at a desired timing and seeing the replay image at the same time, the player can easily designate the temporal position of the highlight scene.

A fourth invention is a game program according to the second invention, and the temporal position and the spatial position of the highlight scene are respectively indicated by frame specifying information and viewpoint specifying information of the replay image, the highlight scene position designating operation is a button push operation performed at an arbitrary timing while the replay image is displayed on the screen, and the creating means describes the frame specifying information and the viewpoint specifying information at a time when the button push operation is performed in the highlight scene positional information (S43, S45).

Here, the frame specifying information is a frame number indicating a reproducing order in one embodiment, but it may be a time stamp indicating a reproducing hour in another embodiment. Furthermore, the viewpoint moves according to a viewpoint changing operation in one embodiment, but it may be moved so as to follow an arbitrary character or group in another embodiment. In the first case, the highlight scene positional information is coordinates indicating the viewpoint at this time, and before the start of the highlight scene, the viewpoint is moved to the position indicated by the coordinates. In the second case, the highlight scene positional information is an ID of an object to be followed at this time, and before the start of the highlight scene, the object to be followed is changed to the character or the group indicated by the ID.

According to the fourth invention, by performing a button push operation at a desired timing and seeing the replay image from an arbitrary viewpoint at the same time, the player can easily designate a temporal position and a special position of the highlight scene.

A fifth invention is a game program according to the third or the fourth invention, and the highlight scene positional image includes a time line (136a) corresponding to a displaying period of the replay image and a highlight scene mark (136c, 136d) indicating a temporal position of the highlight scene by its position on the time line.

According to the fifth invention, it is possible to make the player intuitively perceive the temporal position of the highlight scene.

A sixth invention is a game program according to the fifth invention, and the highlight scene positional image further includes a current time pointer (136b) indicating a current time by a position on the time line.

According to the sixth invention, it is possible to make the player intuitively perceive the time before the highlight scene. Furthermore, it becomes possible to easily perform a fast forward operation, etc.

A seventh invention is a game program according to any one of the first to sixth inventions, and the game program causes the computer to further function as an announcement image displaying means for displaying an announcement image to announce a start of the highlight scene on the screen before the current time arrives at the temporal position of the highlight scene.

In the seventh invention, the game program causes the computer to further function as an announcement image displaying means (S113). The announcement image displaying means displays an announcement image (138) to announce a start of the highlight scene on the screen before the current time arrives at the temporal position of the highlight scene.

According to the seventh invention, making an announcement in advance allows the player to prepare so as not to miss especially the head of the highlight scene.

An eighth invention is a game program according to any one of the first to seventh inventions, and the game program causes the computer to further function as a manner changing means (S121) for changing a manner of the highlight scene mark in response to the current time arriving at the temporal position of the highlight scene.

In the eighth invention, the game program causes the computer to further function as a manner changing means (S121). The manner changing means changes a manner of the highlight scene mark in response to the current time arriving at the temporal position of the highlight scene.

According to the eighth invention, it is possible to make the player clearly perceive the start of the highlight scene.

A ninth invention is a game program according to the fifth invention, and the memory includes a temporary memory area (42e, 46) and a storage area (44, 38), the storing means stores the highlight scene positional information created by the creating means in the temporary memory area, and stores the highlight scene positional information stored in the temporary memory area in the storage area in response to a storing operation by the user, and the highlight scene positional image displaying means displays a first highlight scene mark (136c) on the basis of the highlight scene positional information stored in the temporary memory area, and displays a second highlight scene mark (136d) on the basis of the highlight scene positional information stored in the storage area.

According to the ninth invention, by storing a decided highlight scene position and an undecided highlight scene position by different highlight scene marks through a storing operation, it is possible to visually discriminate one from the other. Furthermore, it is possible to easily change the highlight scene position.

A tenth invention is a game apparatus (12) storing a history in relation to a game operation by a player as replay data in a memory (38, 44, 42e, 46) and displaying a replay image on a screen (28) on the basis of the replay data, and comprises a creating means (S35, S43, S45) for creating highlight scene positional information indicating at least a temporal position of a highlight scene in the replay image on the basis of a highlight scene position designating operation by the player; a storing means (S39) for storing the highlight scene positional information created by the creating means by bringing it into associated with the replay data in the memory; and a highlight scene positional image displaying means (S84) for displaying a highlight scene positional image (136) indicating a temporal position of the highlight scene in the replay image on the screen on the basis of the highlight scene positional information when the replay image is displayed on the screen.

An eleventh invention is a game system (120) including a first game apparatus (12) providing a history in relation to a game operation by a player as replay data and a second game apparatus (12A) displaying a replay image on a screen (28) on the basis of the replay data received from the first game apparatus, and the first game apparatus comprises: a creating means (S35, S43, S45) for creating highlight scene positional information indicating at least a temporal position of a highlight scene in the replay image on the basis of a highlight scene position designating operation by the player; and a providing means (S39, S69, 50, 62) for providing the highlight scene positional information created by the creating means to the second game apparatus by bringing it into associated with the replay data, and the second game apparatus comprises a receiving means (S67, 50, 62) for receiving the highlight scene positional information provided from the first game apparatus by bringing it into associated with the replay data, and a highlight scene positional image displaying means (S84) for displaying a highlight scene positional image indicating a temporal position of the highlight scene in the replay image on the screen on the basis of the highlight scene positional information when the replay image is displayed on the screen.

In each of the tenth and the eleventh inventions, similar to the first invention, it is possible to make the player perceive the highlight scene of the replay image.

According to the present invention, it is possible to implement a game program, a game apparatus and a game system capable of making the opponent who receives the replay data perceive the highlight scene of the replay image.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 10(A) is a configurational example of the screen during playing, and FIG. 10(B) shows a configurational example of the screen during replaying;

FIG. 11(A) shows a screen at a time of the operation, and FIG. 11(B) shows a screen directly after the operation;

FIG. 12(A) shows a screen at a time of a re-recording operation, and FIG. 12(B) shows a screen directly after the re-recording operation;

FIG. 13(A) shows a screen when the highlight scene approaches (before five seconds), and FIG. 13(B) shows a screen when the highlight scene arrives;

FIG. 14(A) shows the screen five seconds before the highlight scene, and FIG. 14(B) shows the screen three seconds before the highlight scene;

DETAILED DESCRIPTION OF THE PREFERRED EMBODIMENTS

Figure 1:
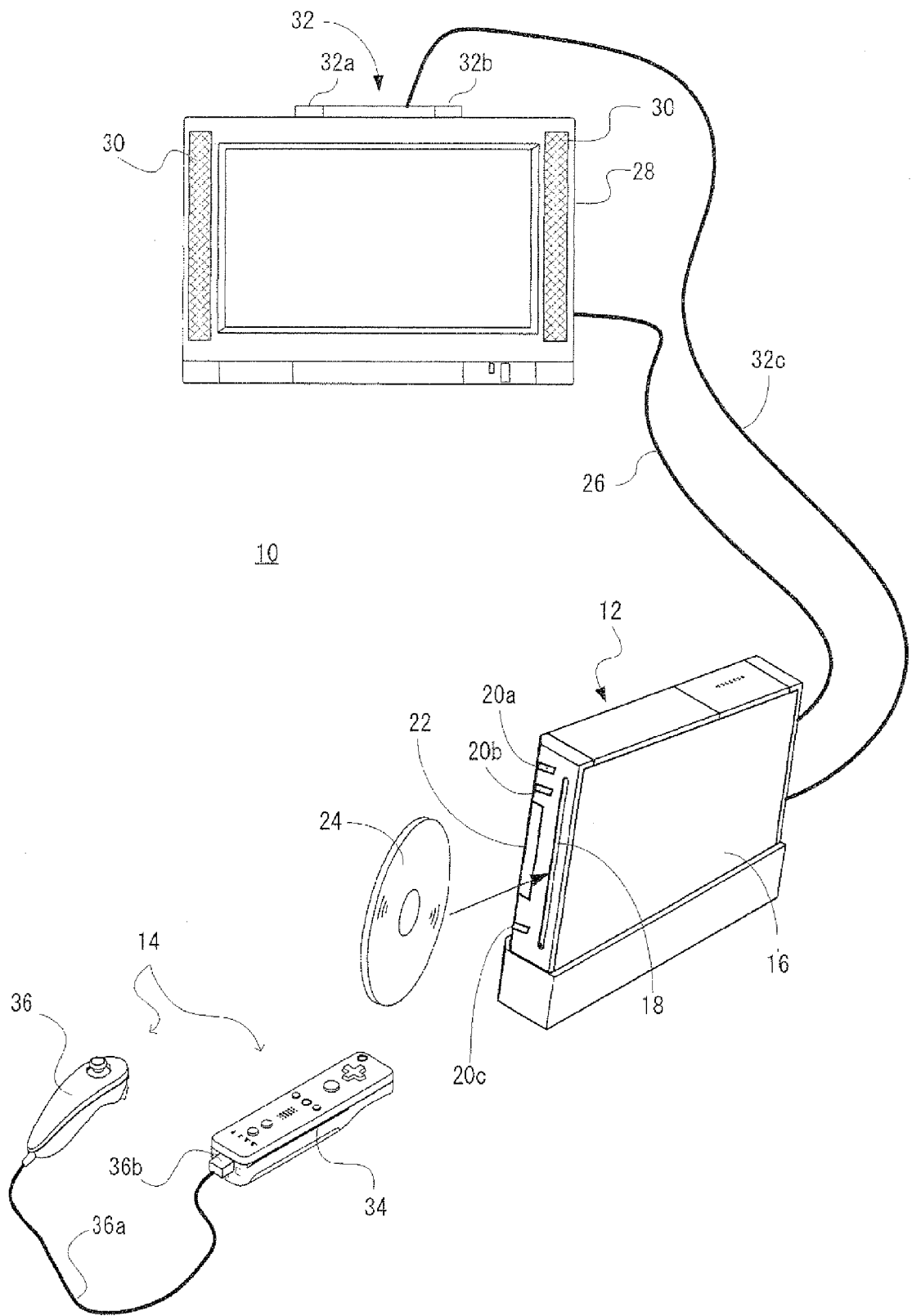
FIG. 1 is an illustrative view showing one embodiment of a game system of the present invention.

Referring to FIG. 1, a game system 10 of one embodiment of the present invention includes a game apparatus 12 and a controller 14. Although illustration is omitted, the game apparatus 12 of this embodiment is designed such that it can be connected to four controllers 14 at the maximum. Furthermore, the game apparatus 12 and the respective controllers 14 are connected in a wireless manner. The wireless communication is executed according to a Bluetooth (registered trademark) standard, for example, but may be executed by other standards such as infrared rays, a wireless LAN. In addition, it may be connected by a wire.

The game apparatus 12 includes a roughly rectangular parallelepiped housing 16, and the housing 16 is furnished with a disk slot 18 on a front surface. An optical disk 24 as one example of an information storage medium storing game program, etc. is inserted from the disk slot 18 to be loaded into a disk drive 54 (see FIG. 2) within the housing 16. Although illustration is omitted, around the disk slot 18, an LED and a light guide plate are arranged such that the LED of the disk slot 18 lights on or off in accordance with various processing.

Furthermore, on the upper front surface of the housing 16 of the game apparatus 12, a power button 20a and a reset button 20b are provided, and an eject button 20c is provided below them. In addition, a connector cover for external memory card 22 is provided between the reset button 20b and the eject button 20c, and in the vicinity of the disk slot 18. Inside the connector cover for external memory card 22, a connector for external memory card 62 (see FIG. 2) is provided, through which an external memory card (hereinafter simply referred to as a "memory card 38") is inserted. The memory card 38 is employed for loading the game program, etc. read from the optical disk 24 to temporarily store it, storing (saving) game data (result data, proceeding data of the game, replay data to be described later) of the game played by means of the game system 10, and so forth. It should be noted that storing the game data described above may be performed on an internal memory, such as a flash memory 44 (see FIG. 2) inside the game apparatus 12 in place of the memory card 38. Also, the memory card 38 may be utilized as a backup memory of the internal memory. In addition, in the game apparatus 12, other application except for the game may be executed, and in such a case, data of the other application can be stored in the memory card 38.

It should be noted that a general-purpose SD card can be employed as a memory card 38, but other general-purpose memory cards, such as memory sticks, multimedia cards (registered trademark) can be employed. Since the memory card 38 can be utilized in another game apparatus 12A having a configuration similar to that of the game apparatus 12, it is possible to provide game data to another player via the memory card 38.

Although omitted in FIG. 1, the game apparatus 12 has an AV cable connector 58 (see FIG. 2) on the back surface of the housing 16, and by utilizing the AV cable connector 58, a monitor 28 and a speaker 30 are connected to the game apparatus 12 through an AV cable 26. The monitor 28 and the speaker 30 are typically a color television receiver, and through the AV cable 26, a video signal from the game apparatus 12 is input to a video input terminal of the color television, and a sound signal from the game apparatus 12 is input to a sound input terminal. Accordingly, a virtual three-dimensional game image of a three-dimensional (3D) video game, for example, is displayed on the screen of the color television (monitor) 28, and a stereo game sound, such as a game music, a sound effect, etc. is output from right and left speakers 30. Around the monitor 28 (on the top side of the monitor 28, in this embodiment), a marker unit 32 including two infrared ray LEDs (markers) 32a and 32b is provided. The marker unit 32 is connected to the game apparatus 12 through a power source cable 32c. Accordingly, the marker unit 32 is supplied with power from the game apparatus 12. Thus, the markers 32a and 32b emit lights ahead of the monitor 28.

Furthermore, the power of the game apparatus 12 is applied by means of a general AC adapter (not illustrated). The AC adapter is inserted into a standard wall socket for home use, and the game apparatus 12 transforms the house current (commercial power supply) to a low DC voltage signal suitable for driving. In another embodiment, a battery may be utilized as a power supply.

The controller 14 includes a first controller 34 and a second controller 36 each of which is holdable with one hand, as a first operation unit and second operation unit although the details are described later. The connector 36b is provided at the end of a cable 36a extending from the bottom end of the second controller 36, and the connector 36b is connected to a connector 34a (FIG. 3, FIG. 5) provided at the bottom end of the first controller 34. Input data fetched from the second controller 36 is applied to the first controller 34 via the cable 36a. The first controller 34 transmit controller data including input data from the first controller 34 itself and the input data from the second controller 36 to the game apparatus 12.

In the game system 10, a user or a player turns the power of the game apparatus 12 on by the power switch 20a for playing the game (or applications other than the game). Then, the user selects an appropriate optical disk 24 recording a program of a video game (or other applications the player wants to play), and loads the optical disk 24 into the disk drive 54 of the game apparatus 12. In response thereto, the game apparatus 12 starts to execute a video game or other applications on the basis of the program recorded in the optical disk 24. The user operates the controller 14 in order to apply an input to the game apparatus 12. For example, by operating any one of the operating buttons of the input portion 82, a game or other application is started. Besides the operation on the input portion 82, by moving the controller 14 itself, it is possible to move a moving image object (player object) in different directions or change the perspective of the user (position of the virtual camera) in a 3-dimensional game world.

It should be noted that programs of video games and other applications are stored (installed) in the internal memory (flash memory 44 (see FIG. 2)) of the game apparatus 12, and executed from the internal memory. In such a case, a program stored in a storage medium like the optical disk 24, or the like may be installed onto the internal memory, and the downloaded program may be installed onto the internal memory.

Figure 2:
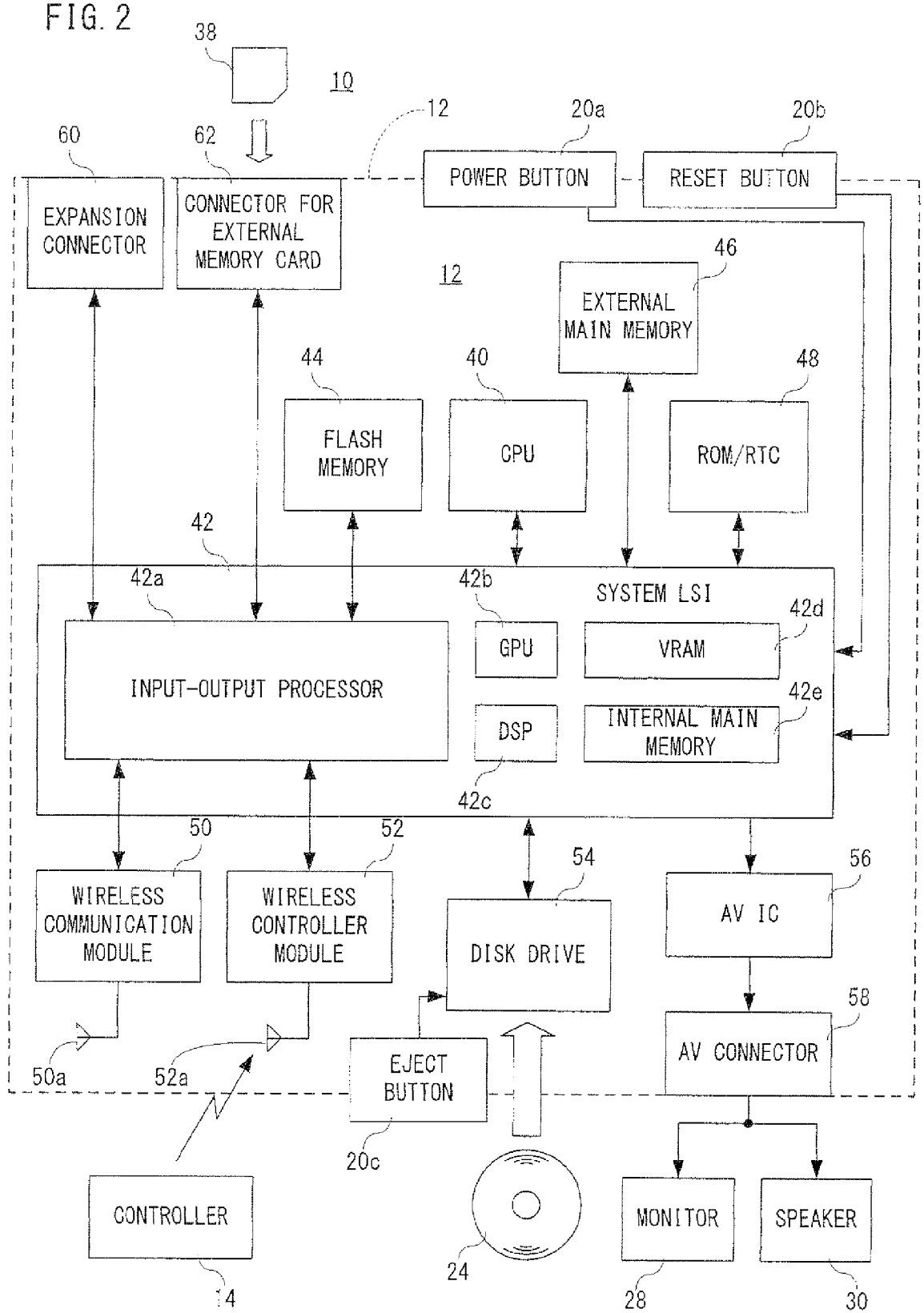
FIG. 2 is a block diagram showing an electric configuration of the game system.

FIG. 2 is a block diagram showing an electric configuration of the game system 10 in FIG. 1 embodiment. Although illustration is omitted, the respective components within the housing 16 are mounted on a printed board. As shown in FIG. 2, the game apparatus 12 has a CPU 40 functioning as a game processor. The CPU 40 is connected with a system LSI 42. The system LSI 42 is connected with an external main memory 46, a ROM/RTC 48, a disk drive 54, and an AV IC 56.

The external main memory 46 is utilized as a work area and a buffer area of the CPU 40 by storing programs like a game program, etc. and various data. The ROM/RTC 48, which is a so-called boot ROM, is incorporated with a program for activating the game apparatus 12, and is provided with a time circuit for counting a time. The disk drive 54 reads a program, texture data, etc. from the optical disk 24, and writes them in an internal main memory 42e described later or the external main memory 46 under the control of the CPU 40.

The system LSI 42 is provided with an input-output processor 42a, a GPU (Graphics Processor Unit) 42b, a DSP (Digital Signal Processor) 42c, a VRAM 42d and an internal main memory 42e, and these are connected with one another by internal buses although illustration is omitted. The input-output processor (IO processor) 42a executes transmission and reception of data and executes download of the data. The GPU 42b is made up of a part of a rendering means, and receives a graphics command (construction command) from the CPU 40 to generate game image data according to the command. Additionally, the CPU 40 applies an image generating program required for generating game image data to the GPU 42b in addition to the graphics command.

Although illustration is omitted, the GPU 42b is connected with the VRAM 42d as described above. The GPU 42b accesses the VRAM 42d to acquire data (image data: data such as polygon data, texture data, etc.) required to execute the construction instruction. Additionally, the CPU 40 writes image data required for rendering to the VRAM 42d via the GPU 42b. The GPU 42b accesses the VRAM 42d to create game image data for rendering.

In this embodiment, a case that the GPU 42b generates game image data is explained, but in a case of executing an arbitrary application except for the game application, the GPU 42b generates image data as to the arbitrary application.

Furthermore, the DSP 42c functions as an audio processor, and generates audio data corresponding to a sound, a voice, music, or the like to be output from the speaker 30 by means of the sound data and the sound wave (tone) data stored in the internal main memory 42e and the external main memory 46.

The game image data and audio data which are generated as described above are read by the AV IC 56, and output to the monitor 28 and the speaker 30 via the AV connector 58. Accordingly, a game screen is displayed on the monitor 28, and a sound (music) necessary for the game is output from the speaker 30.

Furthermore, the input-output processor 42a is connected with an expansion connector 60 and a connector for memory card 62 as well as the flash memory 44, a wireless communication module 50 and a wireless controller module 52. The wireless communication module 50 is connected with an antenna 50a, and the wireless controller module 52 is connected with an antenna 52a.

The input-output processor 42a can communicate with other game apparatuses 10A and a server 124 to be connected to a network 122 via a wireless communication module 50. It should be noted that it is possible to directly communicate with the other game apparatuses 10A without going through the network 122. The input-output processor 42a periodically accesses the flash memory 44 to detect the presence or absence of data (referred to as data to be transmitted) being required to be transmitted to a network 122, and transmits it to the network 122 via the wireless communication module 50 and the antenna 50a in a case that data to be transmitted is present. Furthermore, the input-output processor 42a receives data (referred to as received data) transmitted from the other game apparatuses 10A via the network 122, the antenna 50a and the wireless communication module 50, and stores the received data in the flash memory 44. If the received data does not satisfy a predetermined condition, the received data is abandoned as it is. In addition, the input-output processor 42a can receive data (download data) downloaded from the server 124 connected to the network 122, via the network 122, the antenna 50a and the wireless communication module 50, and can store the download data in the flash memory 44.

Furthermore, the input-output processor 42a receives input data transmitted from the controller 14 via the antenna 52a and the wireless controller module 52, and (temporarily) stores it in the buffer area of the internal main memory 42e or the external main memory 46. The input data is erased from the buffer area after being utilized in processing by the CPU 40 (game processing, for example).

In addition, the input-output processor 42a is connected with the expansion connector 60 and the connector for memory card 62. The expansion connector 60 is a connector for interfaces, such as USB, SCSI, etc., and can be connected with medium such as an external storage, and peripheral devices such as another controller other than the controller 14. Furthermore, the expansion connector 60 is connected with a cable LAN adaptor, and can utilize the cable LAN in place of the wireless communication module 50. The connector for memory card 62 can be connected with an external storage like a memory card 38. Thus, the input-output processor 42a, for example, accesses the external storage via the expansion connector 60 and the connector for memory card 62 to store and read the data.

Although a detailed description is omitted, as shown in FIG. 1, the game apparatus 12 (housing 16) is furnished with the power button 20a, the reset button 20b, and the eject button 20c. The power button 20a is connected to the system LSI 42. When the power button 20a is turned on, the system LSI 42 is set to a mode of a normal energized state (referred to as "normal mode") in which the respective components of the game apparatus 12 are supplied with power through an AC adapter not shown. On the other hand, when the power button 20a is turned off, the system ISI 42 is set to a mode (hereinafter referred to as "standby mode") in which a part of the components of the game apparatus 12 is supplied with power, and the power consumption is reduced to minimum.

In this embodiment, in a case that the standby mode is set, the system LSI 42 issues an instruction to stop supplying the power to the components except for the input-output processor 42a, the flash memory 44, the external main memory 46, the ROM/RTC 48, the wireless communication module 50, and the wireless controller module 52. Accordingly, in this embodiment, the CPU 40 never executes an application in the stand-by mode.

The reset button 20b is also connected with the system LSI 42. When the reset button 20b is pushed, the system LSI 42 restarts the activation program of the game apparatus 12. The eject button 20c is connected to the disk drive 54. When the eject button 20c is pushed, the optical disk 24 is removed from the disk drive 54.

Figure 3:
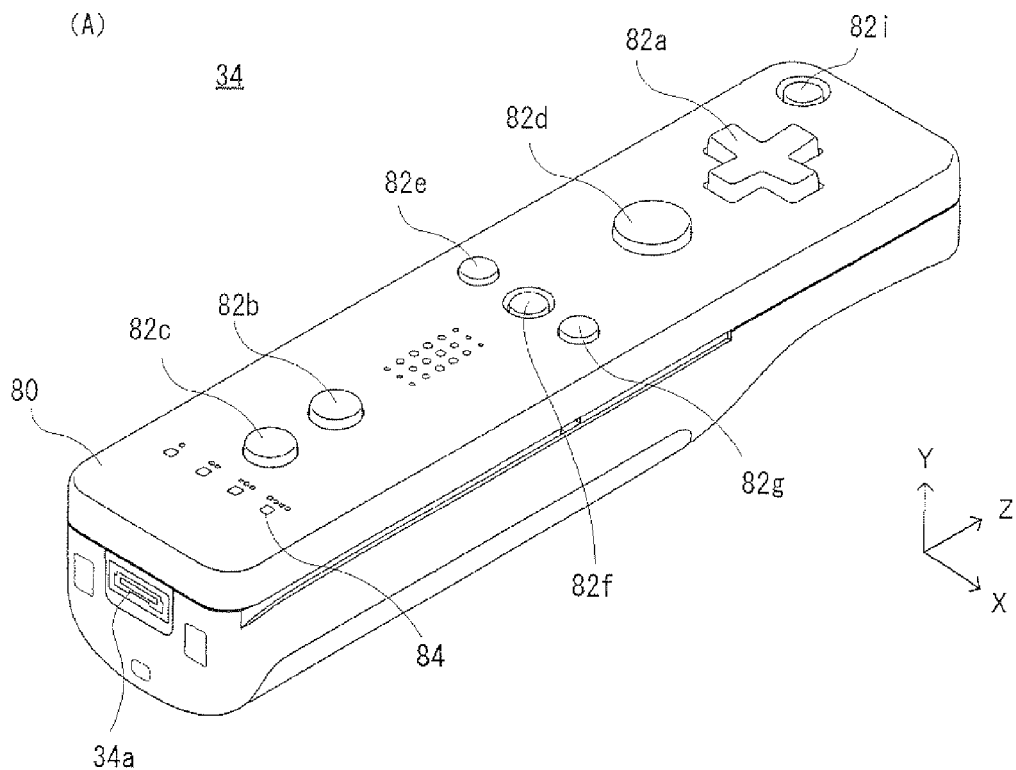
FIG. 3 is an illustrative view showing an appearance of a first controller.
Figure 3:
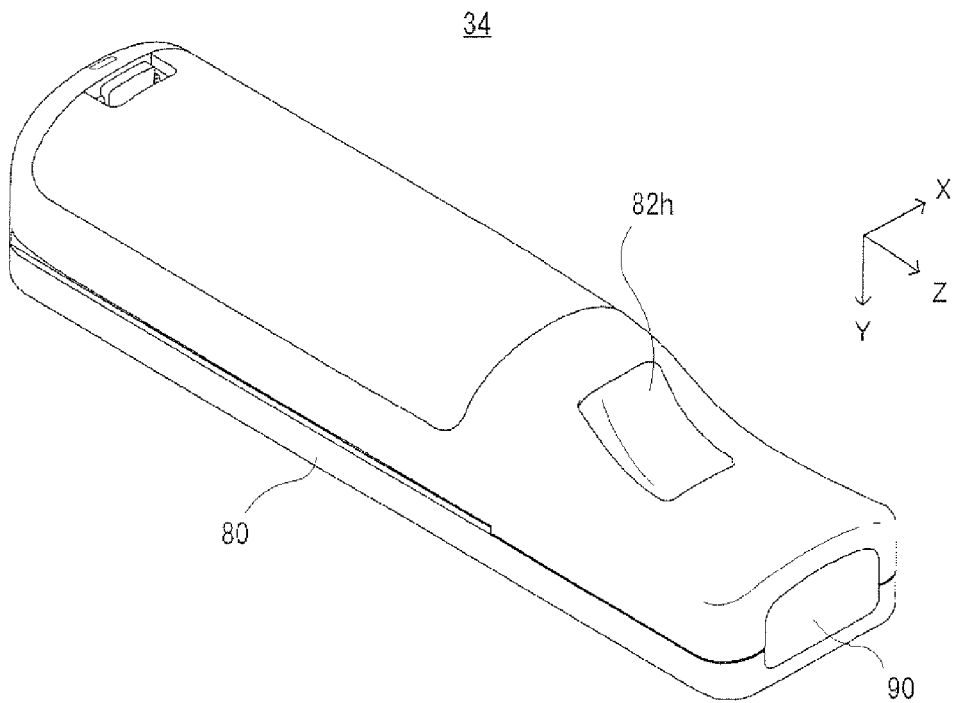

FIG. 3 shows one example of an external appearance of the first controller 34. FIG. 3(A) is a perspective view of the first controller 34 as seeing it from above rear, and FIG. 3(B) is a perspective view of the first controller 34 as seeing it from below front. The first controller 34 has a housing 80 formed by plastic molding, for example. The housing 80 is formed into an approximately rectangular parallelepiped shape regarding a back and forth direction (Z-axis direction shown in FIG. 3) as a longitudinal direction, and has a size small enough to be held by one hand of a child and an adult. As one example, the housing 80 has a length or a width approximately the same as that of the palm of the person. A player can perform a game operation by means of the first controller 34, that is, by pushing buttons provided on it and by moving the first controller 34 itself and changing a position and a direction of the first controller 34 itself.

The housing 80 is provided with a plurality of operation buttons (operation keys). That is, on the top surface of the housing 80, a cross key 82a, a 1 button 82b, a 2 button 82c, an A button 82d, a − button 82e, a menu button 82f, and a + button 82g are provided. Meanwhile, on the bottom surface of the housing 80, a concave portion is formed, and on the reward inclined surface of the concave portion, a E button 82h is provided. Each of the buttons (switches) 82a-82h is assigned an appropriate function according to a game program to be executed by the game apparatus 12. Furthermore, the housing 80 has a power switch 82i for turning on/off the power of the main body of the game apparatus 12 from a remote place on a top surface. The respective buttons (switches) provided on the first controller 34 may inclusively be indicated with the use of the reference numeral 82.

At the back surface of the housing 80, the above-described connector 34a is provided. The connector 34a is a 32 pin edge connector, for example, and utilized for connecting other devices to the first controller 34. In this embodiment, the connector 34a is connected with the connector 36b of the second controller 36. At the back end of the top surface of the housing 80, a plurality of LEDs 84 are provided, and the plurality of LEDs 84 show a controller number (identification number of the controller) of the controller 14. The game apparatus 12 can be connected with a maximum four controllers 14, for example. If a plurality of controllers 14 are connected to the game apparatus 12, a controller number is applied to the respective controllers 14 in the order in which they are connected, for example. Each LED 84 corresponds to the controller number, and the LED 84 corresponding to the controller number lights up.

Furthermore, inside the housing 80 of the first controller 34, an acceleration sensor 86 (FIG. 5) is provided. As an acceleration sensor 86, acceleration sensors of an electrostatic capacity type can typically be utilized. The acceleration sensor 86 detects accelerations of a linear component for each sensing axis and gravitational acceleration out of the accelerations applied to a detection portion of the acceleration sensor. More specifically, in this embodiment, a three-axis acceleration sensor is applied to detect the respective accelerations in directions of three axes of a up and down direction (Y-axial direction shown in FIG. 3), a right and left direction (X-axial direction shown in FIG. 3), and a forward and rearward direction (Z-axial direction shown in FIG. 3) of the first controller 34.

It should be noted that as an acceleration sensor 86, two-axis acceleration sensors may be utilized for detecting any two of the directions of the accelerations out of the up and down direction, the right and left direction and the back and forth direction according to the shape of the housing 80, the limitation on how to hold the first controller 34, or the like. Under certain circumstances, a one-axis acceleration sensor may be used.

Figure 5:
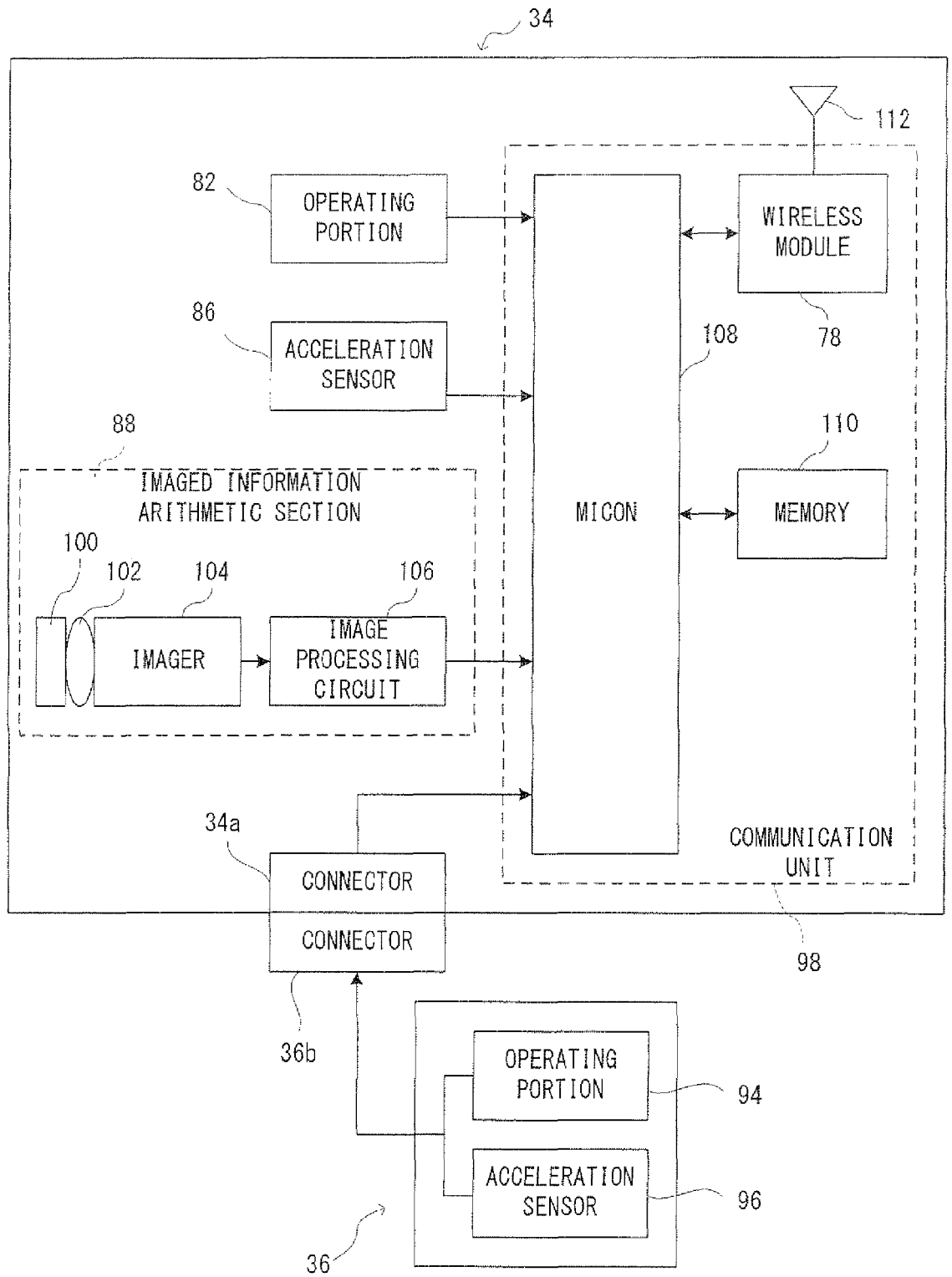
FIG. 5 is a block diagram showing an electric configuration of the controllers (the first controller and the second controller are connected with each other)

In addition, the controller 34 has an imaged information arithmetic section 88 (see FIG. 5). As shown in FIG. 3(B), on the front end surface of the housing 80, a light incident opening 90 of the imaged information arithmetic section 88 is provided, and from the light incident opening 90, infrared rays emitted by the markers 44m and 44n of the sensor bar 44 are captured.

Figure 4:
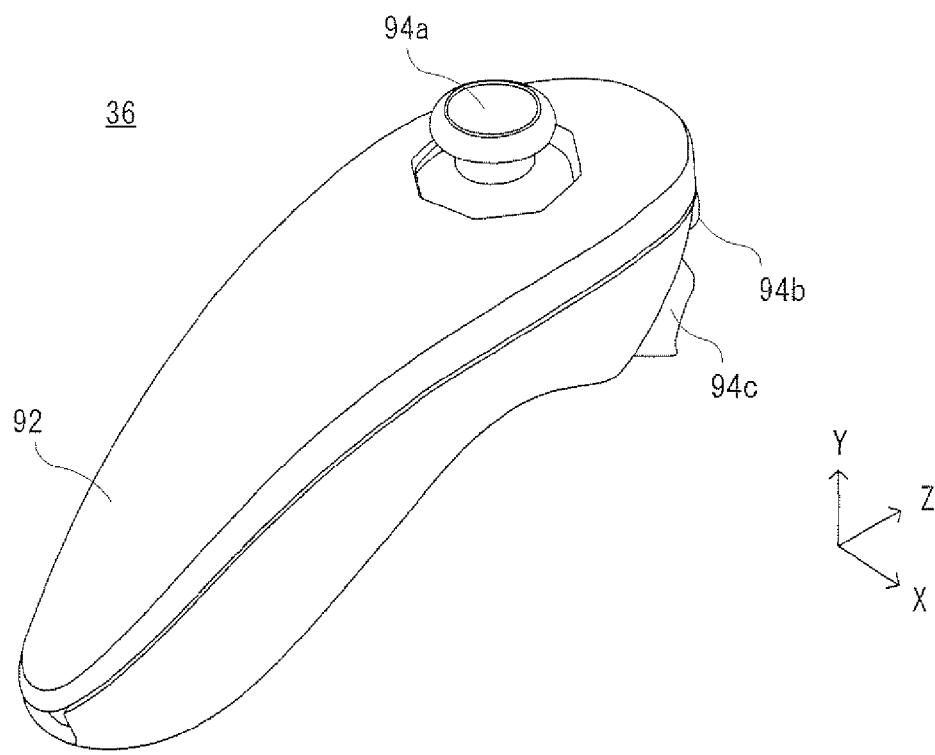
FIG. 4 is an illustrative view showing an appearance of a second controller.
Figure 4:
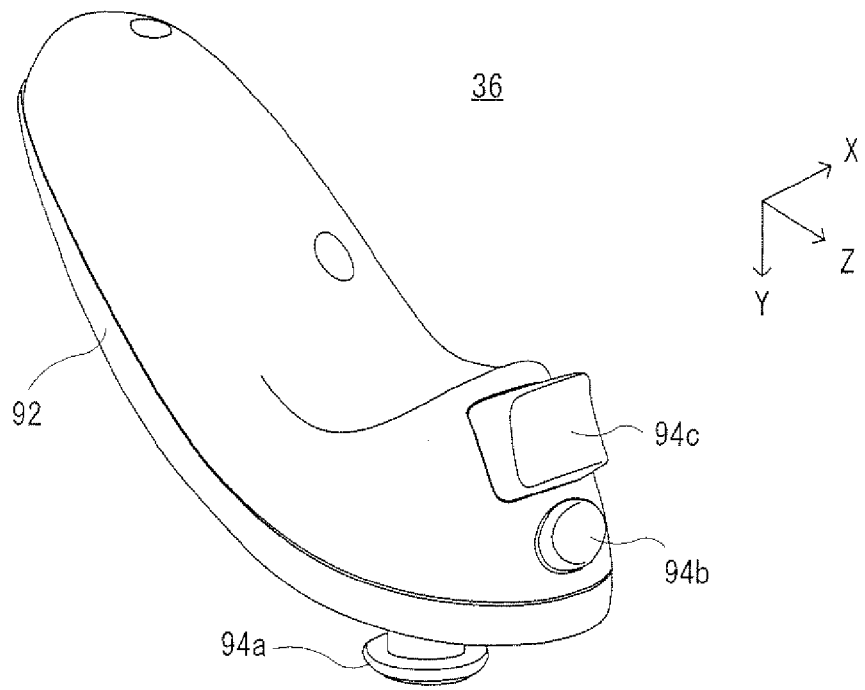

FIG. 4 shows one example of an appearance of the second controller 36. FIG. 4(A) is a perspective view of the second controller 36 as seeing it from above rear, and FIG. 4(B) is a perspective view of the second controller 36 as seeing it from below front. Additionally, in FIG. 4, the cable 36a of the second controller 36 is omitted.

The second controller 36 has a housing 92 formed by plastic molding, for example. The housing 92 is formed into an approximately thin long elliptical shape in the forward and backward directions (Z-axis direction in FIG. 4) when viewed from plane, and the width of the right and left direction (X-axis direction in FIG. 4) at the back end is narrower than that of the front end. Furthermore, the housing 92 has a curved shape as a whole when viewed from a side, and downwardly curved from a horizontal portion at the front end to the back end. The housing 92 has a size small enough to be held by one hand of a child and an adult similar to the first controller 34 as a whole, and has a longitudinal length (in the Z-axis direction) slightly shorter than that of the housing 80 of the first controller 34. Even with the second controller 36, the player can perform a game operation by operating buttons and a stick, and by changing a position and a direction of the controller by moving itself.

At the end of the top surface of the housing 92, an analog joystick 94a is provided. At the end of the housing 92, a front edge slightly inclined backward is provided, and on the front edge are provided a C button 94b and a Z button 94c vertically arranged (Y-axis direction in FIG. 4). The analog joystick 94a and the respective buttons 94b and 94c are assigned appropriate functions according to a game program to be executed by the game apparatus 12. The analog joystick 94a and the respective buttons 94b and 94c provided to the second controller 36 may be inclusively denoted by means of the reference numeral 94.

Inside the housing 92 of the second controller 36, an acceleration sensor 96 (FIG. 5) is provided. As the acceleration sensor 96, an acceleration sensor similar to the acceleration sensor 86 in the first controller 34 is applied. More specifically, the three-axis acceleration sensor is applied in this embodiment, and detects accelerations in the respective three axis directions like an up and down direction (Y-axial direction shown in FIG. 4), a right and left direction (X-axial direction shown in FIG. 4), and a forward and backward direction (Z-axial direction shown in FIG. 4) of the second controller 36.

Additionally, the shapes of the first controller 34 shown in FIG. 3 and the second controller 36 shown in FIG. 4 and the shape, the number and the setting position of the buttons (switches, stick, or the like), etc. are merely one example, and can be changed to other shapes, numbers and setting positions, etc. as needed.

Furthermore, the controller 14 is powered by a battery (not illustrated) detachably incorporated in the first controller 34. The second controller 36 is powered through the connector 34a, the connector 36b, and the cable 36a.

FIG. 5 shows one example of an electric configuration of the controller 14 when the first controller 34 and the second controller 36 are connected with each other. The first controller 34 incorporates a communication unit 98, and the communication unit 98 is connected with the operating portion 82, the acceleration sensor 86, the imaged information arithmetic section 88 and the connector 34a. The operating portion 82 indicates the above-described operation buttons or operating switches 82a-82i. When the operating portion 82 is operated, an operation signal (key information) is applied to the communication unit 98. The data indicative of the acceleration detected by the acceleration sensor 86 is output to the communication unit 98. The acceleration sensor 86 has a sampling frequency in the order of 200 frames per second at maximum.

The data taken by the imaged information arithmetic section 88 is also output to the communication unit 98. The imaged information arithmetic section 88 is constituted by an infrared filter 100, a lens 102, an imager 104 and an image processing circuit 106. The infrared filter 100 passes only infrared rays from the light incident from the light incident opening 90 at the front of the first controller 34. As described above, the markers 44m and 44n of the sensor bar 44 placed near (around) the display screen of the monitor 30 are infrared LEDs for outputting infrared lights ahead of the monitor 30. Accordingly, by providing the infrared filter 100, it is possible to image the image of the markers 44m and 44n more accurately. The lens 102 condenses the infrared rays passing thorough the infrared filter 100 to emit them to the imager 104. The imager 104 is a solid imager, such as a CMOS sensor and a CCD, for example, and images the infrared rays condensed by the lens 102. Accordingly, the imager 104 images only the infrared rays passing through the infrared filter 100 to generate image data. Hereafter, the image imaged by the imager 104 is called an "imaged image". The image data generated by the imager 104 is processed by the image processing circuit 106. The image processing circuit 106 calculates positions of objects to be imaged (markers 44m and 44n) within the imaged image, and outputs marker coordinates data including each coordinate value indicative of the position to the communication unit 98 for each predetermined time (one frame, for example). It should be noted that a description of the image processing circuit 106 is made later.

The connector 34a is connected with the connector 36b of the cable 36a extending from the second controller 36. The connector 36b is connected with the operating portion 94 and the acceleration sensor 96 of the second controller 36. The operating portion 94 denotes the above-described analog joystick 94a and operation buttons 94b and 94c. When the operating portion 94 is operated, an operation signal is applied to the communication unit 98 via the cable 36a, the connector 36b, the connector 34a, etc. The acceleration sensor 96 also has a sampling period similar to that of the acceleration sensor 86, and applies the data indicative of the detected acceleration to the communication unit 98.

The communication unit 98 includes a microcomputer (micon) 108, a memory 110, a wireless module 78 and an antenna 112. The micon 108 transmits the obtained data to the game apparatus 12 and receives data from the game apparatus 12 by controlling the wireless module 78 while using the memory 110 as a memory area (working area and buffer area) in processing.

The data output from the operating portion 82, the acceleration sensor 86 and the imaged information arithmetic section 88 of the first controller 34, and the operating portion 94 and acceleration sensor 96 of the second controller 36 to the micon 108 is temporarily stored in the memory 110. The wireless transmission from the communication unit 98 to the Bluetooth communication unit 76 of the game apparatus 12 is performed every predetermined cycle. The game processing is generally performed by regarding 1/60 seconds as a unit, and therefore, it is necessary to perform the transmission from the first controller 34 at a cycle equal to or shorter than it. The micon 108 outputs data including the operation data of the operating portions 82 and 94 and the acceleration data of the acceleration sensors 86 and 96, and marker coordinates data from the imaged information arithmetic section 88 stored in the memory 110 to the wireless module 78 as controller data when transmission timing to the game apparatus 12 has come. The wireless module 78 modulates a carrier of a predetermined frequency by the controller data, and emits its weak radio wave signal from the antenna 112 by using a short-range wireless communication technique, such as Bluetooth (trademarks). Namely, the controller data is modulated to the weak radio wave signal by the wireless module 78 and transmitted from the first controller 34. The weak radio wave signal is received by the Bluetooth communication unit 76 of the game apparatus 12. The weak radio wave thus received is subjected to demodulating and decoding processing, and this making it possible for the game apparatus 12 to obtain the controller data. The CPU 46 of the game apparatus 12 performs the game processing on the basis of the controller data, obtained from the controller 14.

It will be appreciated by those skilled in the art from the description of this specification that a computer, such as a processor (CPU 46, for example) of the game apparatus 12 or the processor (micon 108, for example) of the controller 14 executes processing on the basis of an acceleration signal output from the acceleration sensors 86 and 96, and can estimate or calculate (determine) more information relating to the controller 14. In a case that processing is executed on the side of the computer assuming that the first controller 34 and second controller 36 respectively incorporated with the acceleration sensors 86 and 96 are in a static state (that is, processing is executed considering that accelerations detected by the acceleration sensors 86 and 96 are only gravitational accelerations), if the first controller 34 and the second controller 36 are actually in a static state, it is possible to know whether or not the orientations of the first controller 34 and the second controller 36 are inclined with respect to the direction of gravity or to what extent they are inclined, on the basis of the detected acceleration. More specifically, when a state in which the detection axes of the acceleration sensors 86 and 96 are directed to a vertically downward direction is taken as a reference, merely whether or not 1G (gravitational acceleration) is imposed on can show whether or not each of the first controller 34 and the second controller 36 is inclined, and the size can show to what extent each of them is inclined. Furthermore, if a multi-axis acceleration sensor is applied, by further performing processing on an acceleration signal of each axis, it is possible to more precisely know to what extent the first controller 34 and the second controller 36 are inclined with respect to the direction of gravity. In this case, on the basis of outputs from the acceleration sensors 86 and 96, the computer may perform processing of calculating data of inclined angles of the first controller 34 and second controller 36, but perform processing of estimating an approximate inclination on the basis of the outputs from the acceleration sensors 86 and 96 without performing the processing of calculating the data of the inclined angle. Thus, by using the acceleration sensors 86 and 96 in conjunction with the computer, it is possible to determine an inclination, an orientation or a position of each of the first controller 34 and second controller 36.

On the other hand, assuming that the acceleration sensors 86 and 96 are in a dynamic state, accelerations according to the movement of the acceleration sensors 86 and 96 are detected in addition to the gravitational acceleration component, and therefore, if the gravitational acceleration component is removed by predetermined processing, it is possible to know a moving direction, etc. More specifically, in a case that the first controller 34 and the second controller 36 respectively being furnished with the acceleration sensors 86 and 96 are accelerated and moved by the hands of the user, acceleration signals generated by the acceleration sensors 86 and 96 are processed by the above-described computer, and whereby, it is possible to calculate various movements and/or positions of the first controller 34 and the second controller 36. Additionally, even when assuming that the acceleration sensors 86 and 96 are in a dynamic state, if an acceleration in correspondence with the movement of each of the acceleration sensors 86 and 96 is removed by the predetermined processing, it is possible to know the inclination with respect to the direction of gravity. In another embodiment, each of the acceleration sensors 86 and 96 may contain a built-in signal processing apparatus or other kinds of dedicated processing apparatuses for performing desired processing on the acceleration signal output from the incorporated acceleration detecting means before outputting the signal to the micon 108. For example, in a case that the acceleration sensors 86 and 96 are ones for detecting a static acceleration (gravitational acceleration, for example), the built-in or dedicated processing apparatuses may be ones for transforming the detected acceleration signal into the inclined angle (or other preferable parameters) corresponding thereto.

Figure 6:
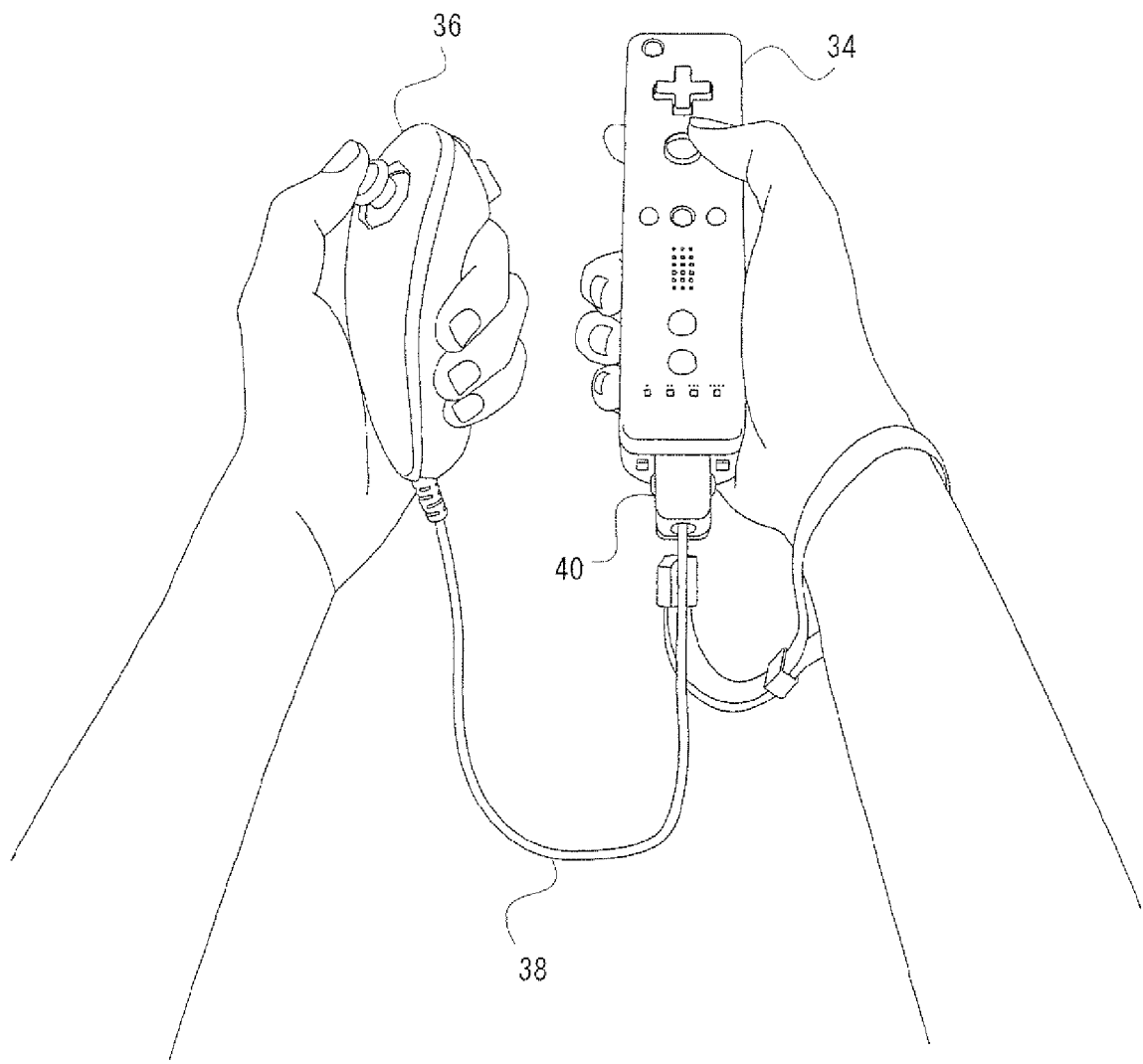
FIG. 6 is an illustrative view for roughly explaining a situation in which a virtual game is played by utilizing the controllers.

In this game system 10, a user can make an operation or input to the game by moving the controller 14. In playing the game, for example, the user holds the first controller 34 with the right hand and the second controller 36 with the left hand as shown in FIG. 6. As described above, in this embodiment, the first controller 34 is incorporated with the acceleration sensor 86 for detecting accelerations in the three-axis directions, and the second controller 36 is also incorporated with the same acceleration sensor 96. When the first controller 34 and the second controller 36 are moved by the user, acceleration values respectively indicating the movements of the controllers themselves are detected by the acceleration sensor 86 and the acceleration sensor 96. In the game apparatus 12, game processing can be executed according to the detected acceleration values.

Furthermore, the first controller 34 is provided with the imaged information arithmetic section 88, and this makes it possible for the user to utilize the first controller 34 as a pointing device. In this case, the user holds the first controller 34 with the edge surface (light incident opening 90) of the first controller 34 directed to the markers 44m and 44n. It should be noted that as understood from FIG. 1, the markers 44m and 44n are placed around a predetermined side (top or bottom) of the monitor 30 in parallel with the predetermined side. In this state, the user can perform a game operation by changing a position on the screen designated by the first controller 34 by moving the first controller 34 itself, and by changing distances between the first controller 34 and each of the markers 44m and 44n.

Figure 7:
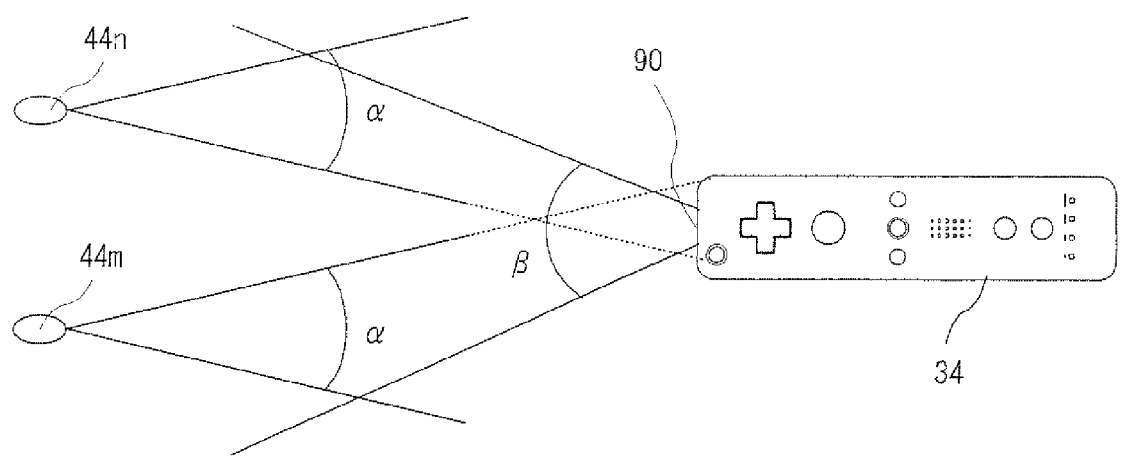
FIG. 7 is an illustrative view showing viewing angles of markers and the controller.

FIG. 7 is a view explaining viewing angles between the respective markers 44m and 44n, and the first controller 34. As shown in FIG. 7, each of the markers 44m and 44n emits infrared ray within a range of a viewing angle $\alpha$. Also, the imager 104 of the imaged information arithmetic section 88 can receive incident light within the range of the viewing angle $\beta$ taking the line of sight of the first controller 34 (Z axis direction in FIG. 3) as a center. For example, the viewing angle $\alpha$ of each of the markers 44m and 44n is 34° (half-value angle) while the viewing angle $\beta$ of the imager 104 is 42°. The user holds the first controller 34 such that the imager 104 is directed and positioned so as to receive the infrared rays from the markers 44m and 44n. More specifically, the user holds the first controller 34 such that at least one of the markers 44m and 44n exists in the viewing angle $\beta$ of the imager 104, and the first controller 34 exists in at least one of the viewing angles $\alpha$ of the marker 44m or 44n. In this state, the first controller 34 can detect at least one of the markers 44m and 44n. The user can perform a game operation by changing the position and the orientation of the first controller 34 in the range satisfying the state. Also, in a case that any one of the makers 44m and 44n is only detected, by setting temporary marker coordinates in place of the other marker which is not detected by means of previously detected data of the two makers 44m and 44n, an instructed position by the first controller 34 can be calculated.

If the position and the orientation of the first controller 34 are out of the range, the game operation based on the position and the orientation of the first controller 34 cannot be performed. Thus, the above-described range is called an "operable range."

Figure 8:
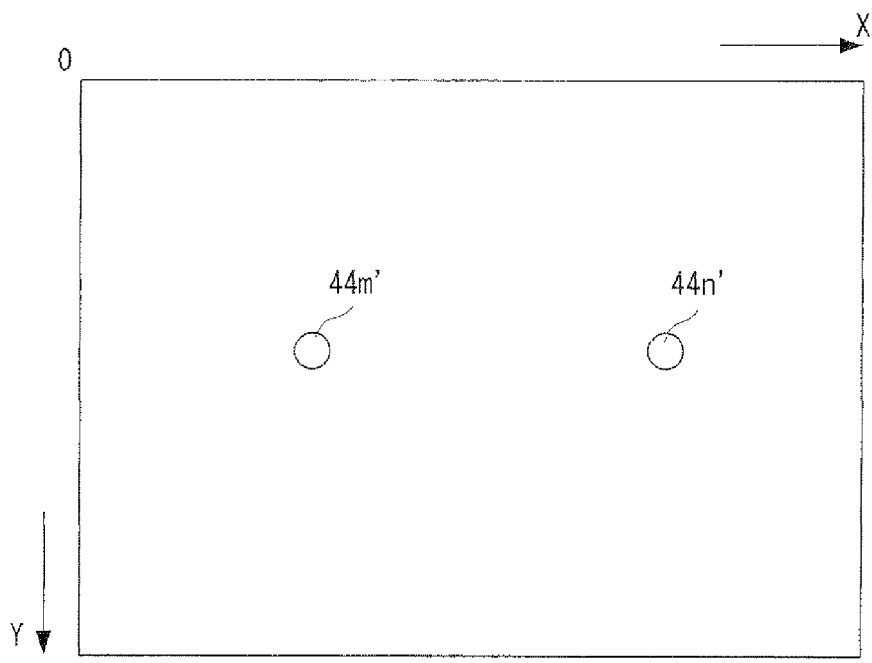
FIG. 8 is an illustrative view showing one example imaged images of the controller.
Figure 9:
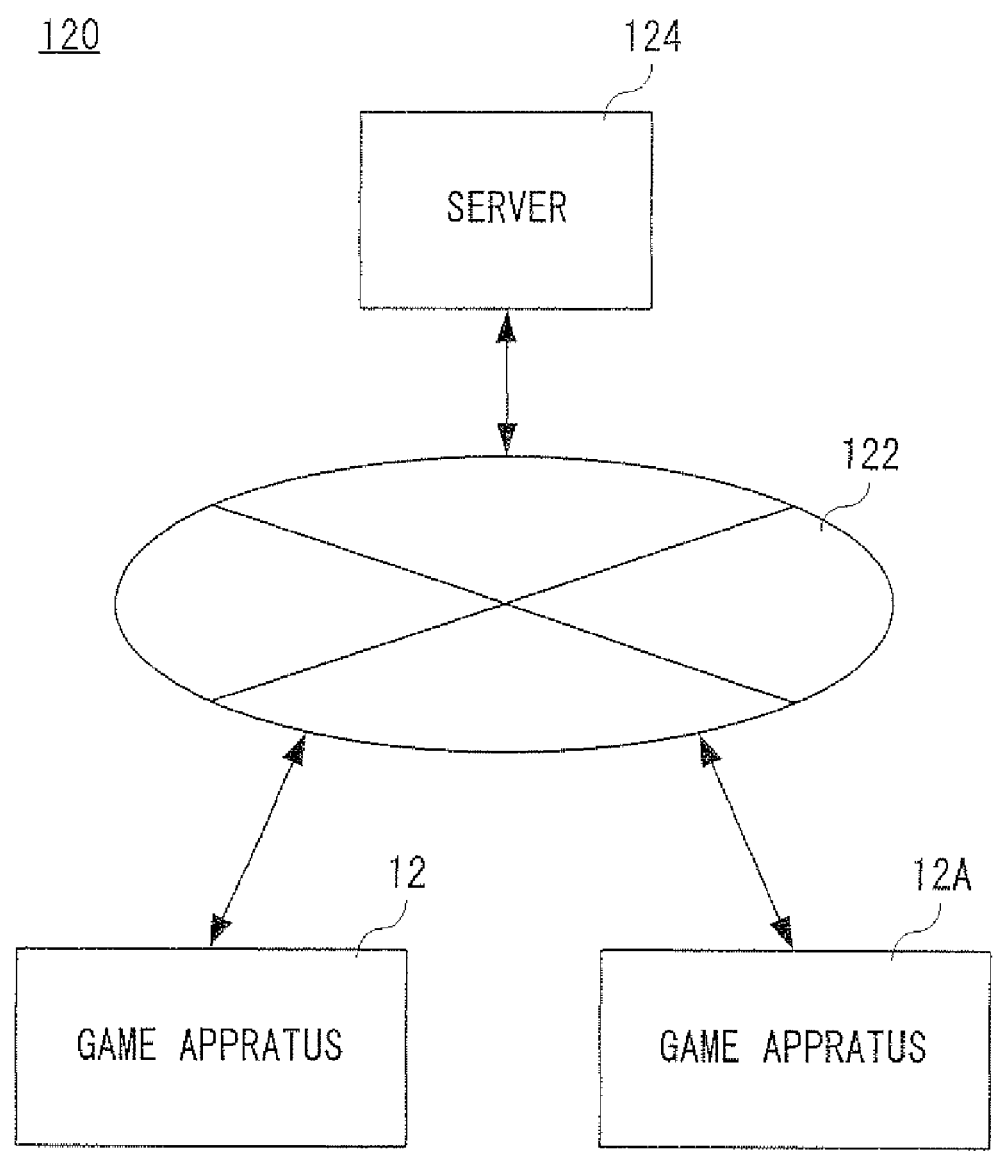
FIG. 9 is a block diagram showing a network system including a first game apparatus and a second game apparatus.

If the first controller 34 is held within the operable range, an image of each of the markers 44m and 44n is imaged by the imaged information arithmetic section 88. That is, the imaged image obtained by the imager 104 includes an image (object image) of each of the markers 44m and 44n as an object to be imaged. FIG. 8 is a view showing one example of the imaged image including an object image. The image processing circuit 106 calculates coordinates (marker coordinates) indicative of the position of each of the markers 44m and 44n in the imaged image by utilizing the image data of the imaged image including the object images 44m' and 44n'.

Since the object images 44m' and 44n' appear as a high-intensity part in the image data of the imaged image, the image processing circuit 106 first detects the high-intensity part as a candidate of the object image. Next, the image processing circuit 106 determines whether or not the high-intensity part is an object image on the basis of the size of the detected high-intensity part. The imaged image may include images other than the object image due to sunlight through a window and light of a fluorescent lamp in the room as well as the two object images 44m' and 44n' (marker images). The determination processing whether or not the high-intensity part is an object image is executed for discriminating the images 44m' and 44n' of the two markers 44m and 44n from the images other than them, and accurately detecting the object image. In order to discriminate the object images 44m' and 44n' in the imaged image from other images, the imaging objects 44m and 44n are necessary to be known, and in this embodiment, the size is decided in advance, and therefore, it is possible to estimate the size of the marker images 44m' and 44n'. Thus, on the basis of the size of the high-intensity part, it is possible to make a determination of the marker images 44m' and 44n'. More specifically, in the determination process, it is determined whether or not the detected high-intensity part is within the size of the preset predetermined range. Then, if the high-intensity part is within the size of the predetermined range, it is determined that the high-intensity part represents the object image. On the contrary, if the high-intensity part is not within the size of the predetermined range, it is determined that the high-intensity part represents the images other than the object image.

In addition, as to the high-intensity part which is determined to represent the object image as a result of the above-described determination processing, the image processing circuit 106 calculates the position of the high-intensity part. More specifically, the barycenter position of the high-intensity part is calculated. Here, the coordinates of the barycenter position is called a "marker coordinates". Also, the barycenter position can be calculated with more detailed scale than the resolution of the imager 104. Now, the resolution of the imaged image imaged by the imager 104 shall be 126×96, and the barycenter position shall be calculated with the scale of 1024×768. That is, the marker coordinates is represented by the integer from (0, 0) to (1024, 768).

Additionally, as shown in FIG. 8, the positions in the imaged image are represented in a coordinate system (X-Y coordinate system of the imaged image) by taking the upper left of the imaged image as an origin O, the downward direction as the Y-axis positive direction, and the right direction as the X-axis positive direction.

Furthermore, in a case that the object images 44m' and 44n' are accurately detected, the two high-intensity parts are determined as object images by the determination processing, so that, the two marker coordinates are calculated. The image processing circuit 106 outputs data indicative of the calculated two marker coordinates, that is, imaging object data indicative of positions of the imaging objects to the communication unit 98. The output imaging object data (marker coordinate data) is included in the controller data by the micon 108 as described above, and transmitted to the game apparatus 12.

When acquiring the marker coordinate data from the received controller data, the game apparatus 12 (CPU 46) can calculate designated positions (designation coordinates) of the first controller 34 on the screen of the monitor 30 and the distance from the first controller 34 to each of the markers 44m and 44n on the basis of the marker coordinate data. For example, when the first controller 34 designates the left end of the monitor 30, the object images 44m' and 44n' are detected at the right of the imaged image, and when the first controller 34 instructs the lower end of the screen, the object images 44m' and 44n' are detected at the upper of the imaged image. In other words, the marker coordinates on the imaged image are detected at positions in reverse to the designation positions with the first controller 34 on the screen. Accordingly, when the coordinates of the instruction positions of the first controller 34 are calculated from the marker coordinates, the coordinate system is appropriately transformed from the coordinate system of the imaged image in FIG. 8 to a coordinate system for representing positions on the screen.

Additionally, in this embodiment, in the first controller 34, predetermined arithmetic processing is performed on the imaged data to detect the marker coordinates, and the marker coordinate data is transmitted to the game apparatus 12. However, in another embodiment, imaged data is transmitted as controller data from the first controller 34 to the game apparatus 12, and the CPU 46 of the game apparatus 12 performs predetermined arithmetic processing on the imaged data to detect the marker coordinates and the coordinates of the designation positions.

Furthermore, the distance between the object images in the imaged image is changed depending on the distance between the first controller 34 and each of the markers 44m and 44n. Since the distance between the markers 44m and 44n, the width of the imaged image, and the viewing angle β of the imager 104 are decided in advance, by calculating the distance between the two marker coordinates, the game apparatus 12 can calculate the current distance between the first controller 34, and each of the markers 44m and 44n.

In the game apparatus 10 configured as described above, a history in relation to a game operation by the player is stored as replay data during a game play, and a play image played by the player can be reproduced (replayed) thereafter on the basis of the replay data (hereinafter, the image thus reproduced is called "replay image"). By transmitting the stored replay data to the network 122, it is possible to perform a replay in another game apparatus 10A, for example. The replay data can be provided via a storage medium, such as memory card 38, etc. beyond the communication medium, such as a network 122, etc. Furthermore, when the player performs an operation of designating a highlight scene position during replaying, highlight scene positional information is added to the replay data, and during the replay, a highlight scene of the replay is clearly shown on the basis of the highlight scene positional information.

In this game, a player character makes a battle with an enemy character while moving within the game space. The virtual camera moves within the game space in order to capture such a battle by a manual operation (operation with respect to the operating portion 82 or movement of the controller 14 itself, for example) in a free camera mode and by an automatic control in a following camera mode. The aforementioned highlight scene positional information is a temporal position and a spatial position of the highlight scene. For example, the temporal position is represented by a frame number (or time stamp) of the replay image, and the spatial position is represented by viewpoint coordinates of the virtual camera (or followed object ID).

Figure 10:
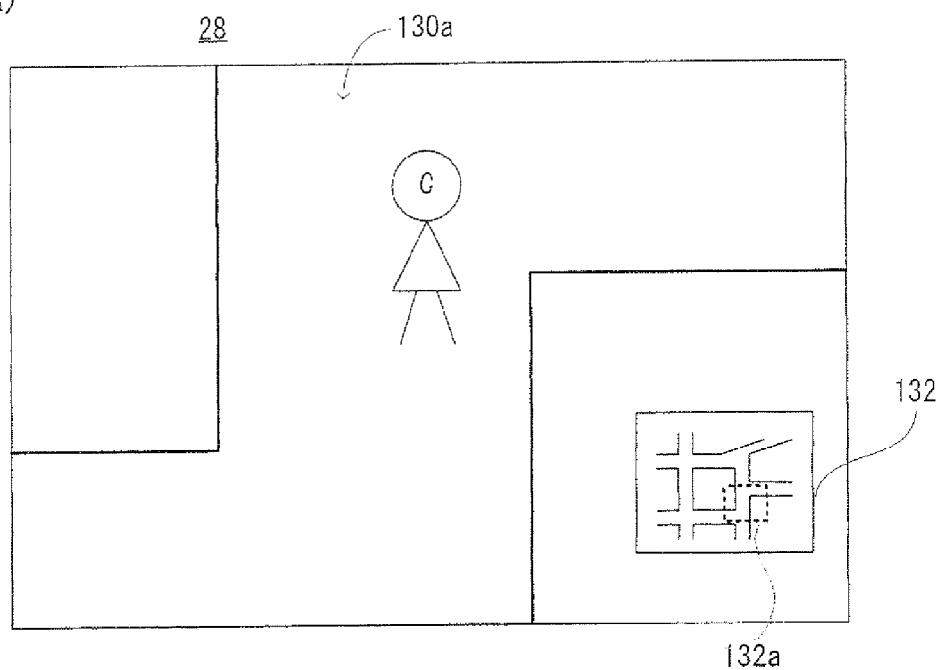
FIG. 10 is an illustrative view for showing a configuration of a game screen.
Figure 10:
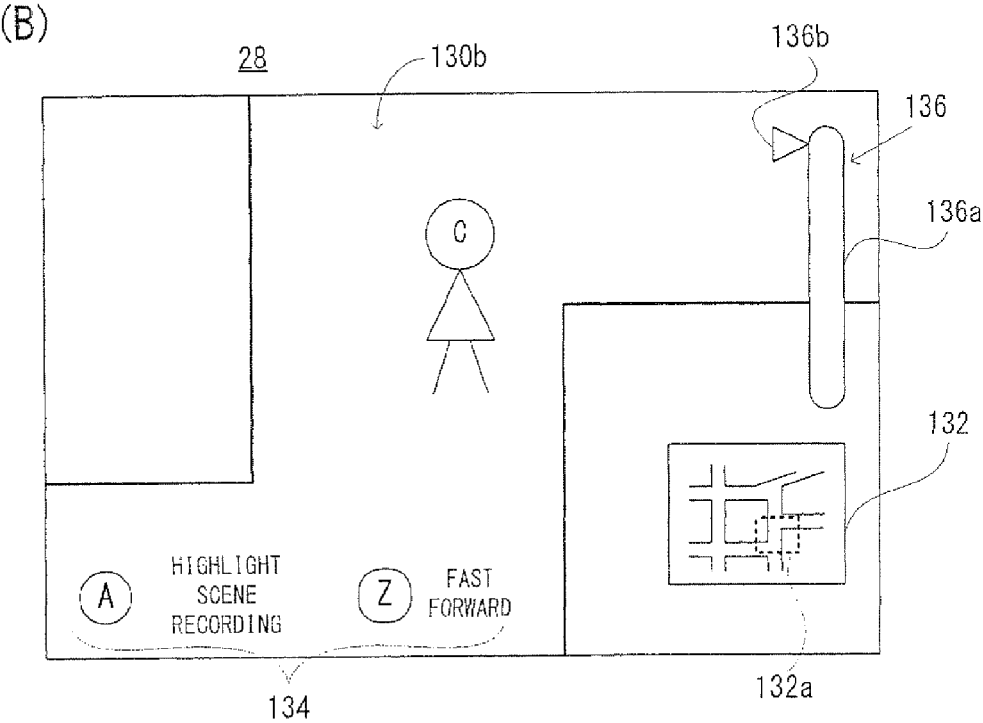

FIG. 10 is an illustrative view showing how different the configuration of the game screen of the monitor 28 is between during the game playing and during the game replaying and FIG. 10(A) shows a configurational example during the game playing, and FIG. 10(B) shows a configurational example during the game replaying. Referring to FIG. 10(A), the game screen during the playing includes a part currently captured by a virtual camera (not illustrated) within the game space, that is, an image (play image) 130a of an subject image including a player character C and a mini map image 132 indicating where this part is within the game space. In this example, the play image 130a is displayed over the entire screen, and the mini-map image 132 is displayed so as to be overlapped with the play image 130a at the lower right corner.

Referring to FIG. 10(B), the game screen during the replaying further includes a time-line image 136 and a button image 134 in addition to the replay image 130b corresponding to the aforementioned play image 130a and the mini-map image 132. In this example, the time-line image 136 is arranged at the upper right corner of the screen, and the button image 134 is arranged at the lower left corner of the screen. The button image 134 is made up of "A" and "Z" which respectively mean the A button 82d and the Z button 94c of the controller 14, and "highlight scene recording" and "fast forward" which means functions respectively assigned to the A button 82d and the Z button 94c.

The time-line image 136 includes a time line 136a indicating a replay period and a current time pointer 136b indicating where the current time is on the time line 136a during a replay period. In this example, the top end and the bottom end of the time line 136a respectively correspond to a starting time and an end time of the replay, and the current time pointer 136b moves from the top end to the bottom end of the time line 136a as the replay progresses. The length of the time line 136a is constant irrespective of the length of the playing time in this embodiment. However, the time-line image 136 can be any images if they represent a current time and a temporal position of a highlight scene on the temporal axis. Furthermore, the length of the time line 136a is not restricted to the constant, and may be changed depending on the length of the replaying period.

Figure 11:
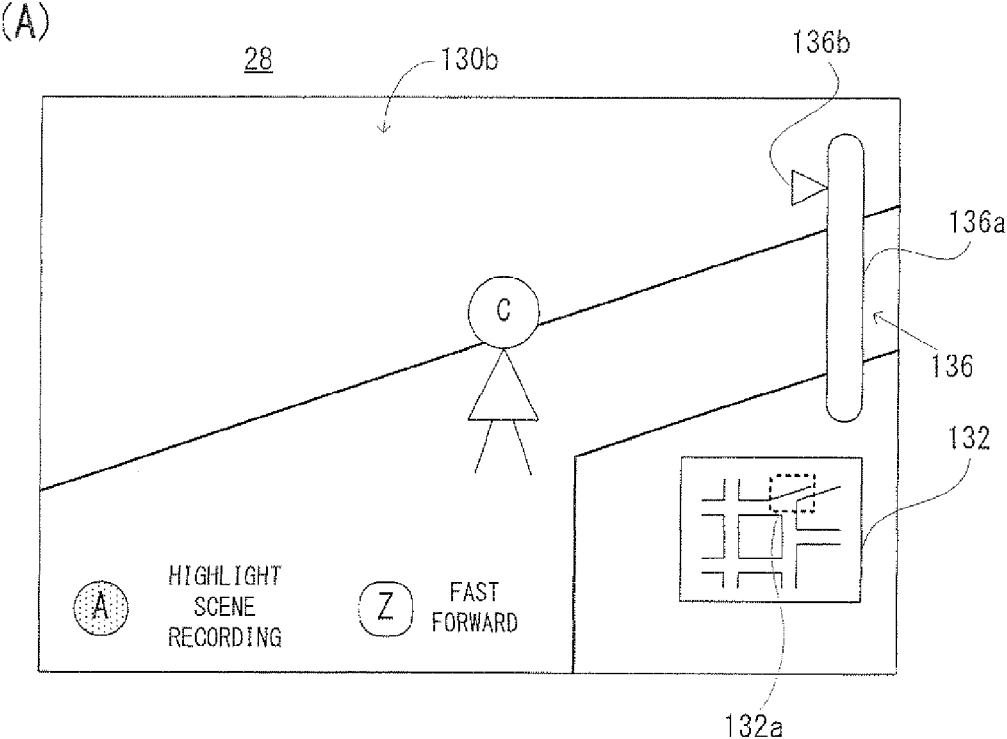
FIG. 11 is an illustrative view showing how the game screen is changed when a highlight scene recording operation is performed during replaying.
Figure 11:
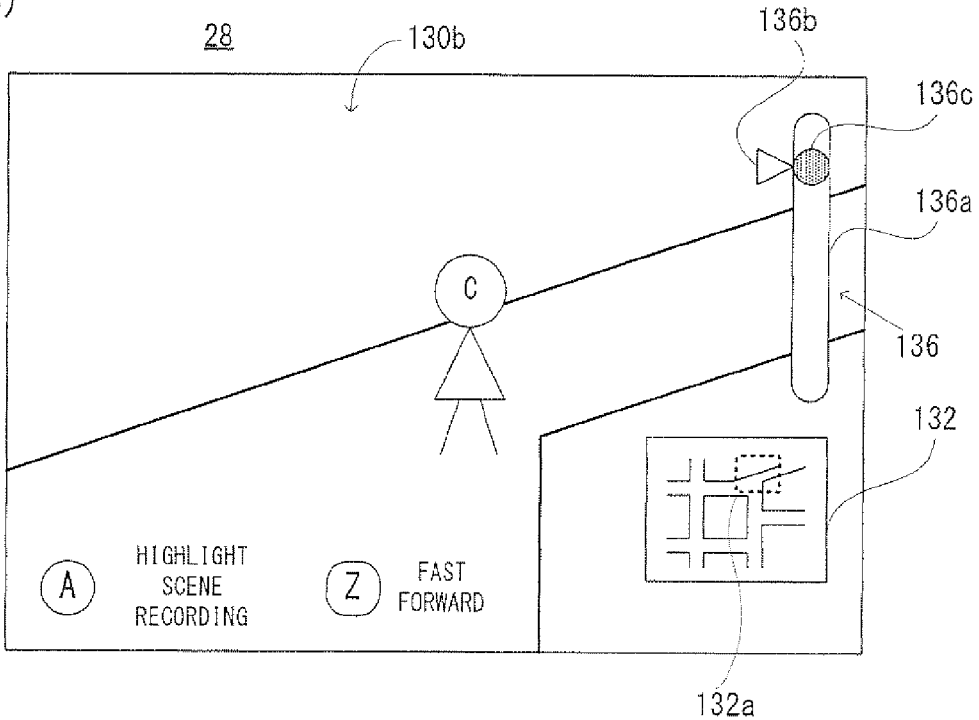

FIG. 11 is an illustrative view showing how the game screen changes when a highlight scene recording operation is performed during replaying, FIG. 11(A) shows a screen at a time of the operation, and FIG. 11(B) shows a screen directly after the operation. Here, the screen in FIG. 11(A) is the screen when a predetermined time elapses from the screen in FIG. 10(B), and during this period, the player character C and the virtual camera (not illustrated) move according to a manual operation, and the current time pointer 136b on the time line 136a is displaced by a distance corresponding to the elapsed time. When the A button 82d is pushed during the replay, the display manner (color, shape, etc.) of the "A" button within the screen is first changed as shown in FIG. 11(A), and the highlight scene mark 136c (yellow, here) is displayed at the position represented by the current time pointer 136b on the time line 136a as shown in FIG. 11(B).

It-should be noted that in this embodiment, a highlight scene recording operation can be performed as many times, but the number of recordable highlight scenes is one, and therefore, every time that a highlight scene recording operation is performed, the display position of the highlight scene mark 136c is changed. Furthermore, when a highlight scene storing operation is performed after the highlight scene recording operation, the highlight scene recorded at this time is stored as a decided highlight scene, and the highlight scene mark 136c shown in FIG. 11(B) is changed to the highlight scene mark 136d (red here) shown in FIG. 12(A). The highlight scene mark thus has two kinds including the highlight scene mark 136c meaning to be an undecided highlight scene and the highlight scene mark 136d being to be a decided highlight scene. Although the difference between the two kinds of the highlight scene marks 136c and 136d is a color, here, a size, a shape, brightness may be differentiated alternative to or in addition to this.

Figure 12:
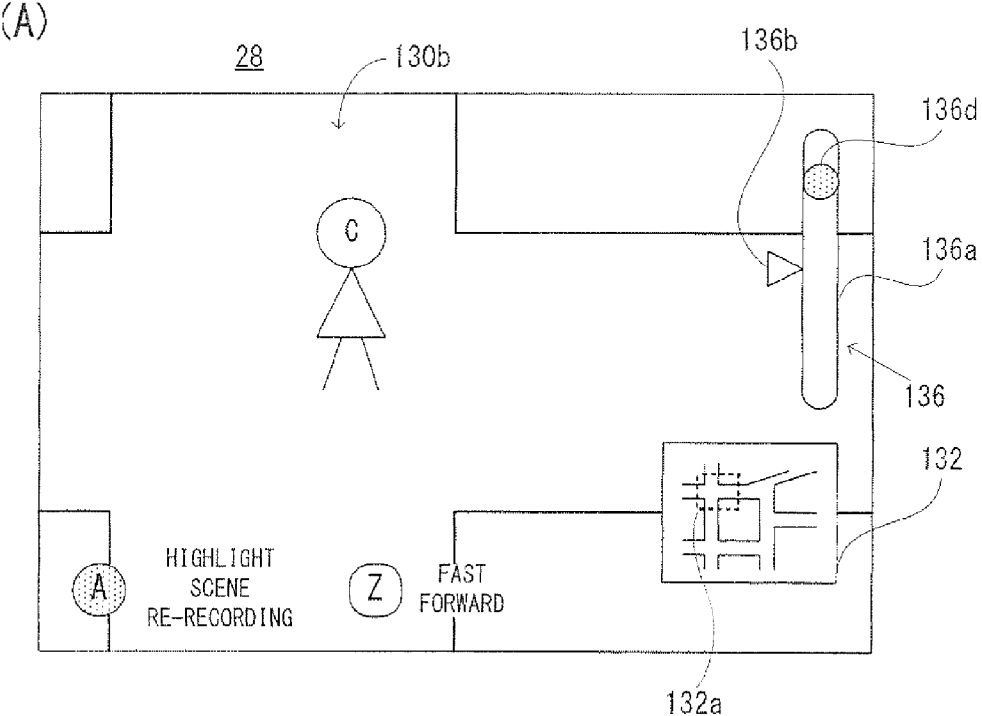
FIG. 12 is an illustrative view showing how the game screen is changed when a highlight scene recording operation is performed again after a highlight scene is decided.
Figure 12:
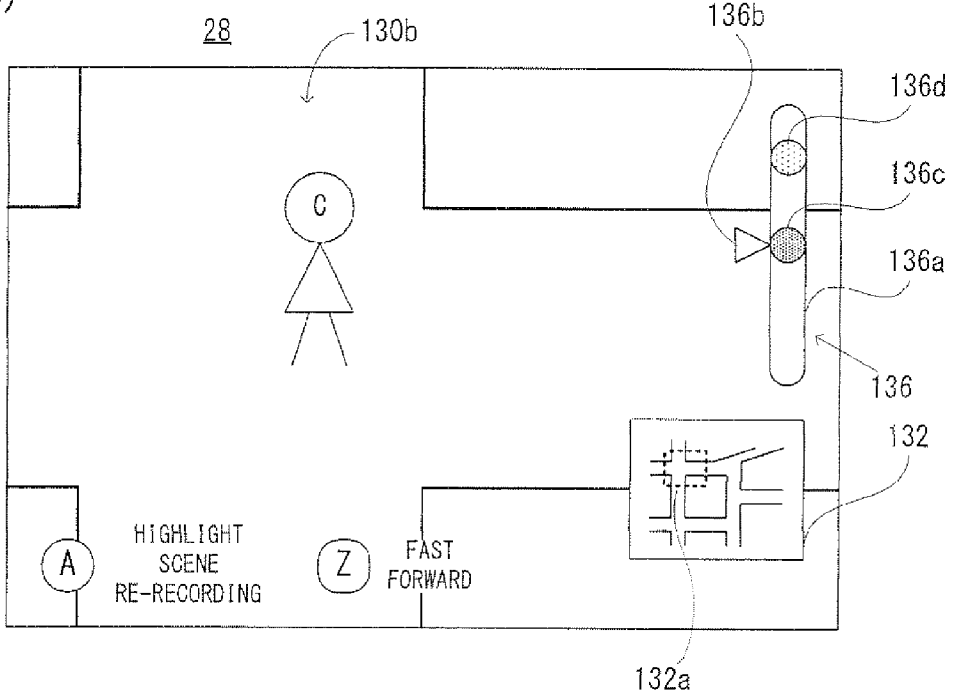

FIG. 12 is an illustrative view showing how the game screen changes when a highlight scene recording operation is performed again after the highlight scene is decided, FIG. 12(A) shows a screen at a time of a re-recording operation, and FIG. 12(B) is a screen directly after the re-recording operation. It should be noted that the screen in FIG. 12(A) is a screen after a predetermined time elapses from the screen in FIG. 11(B), in which the player character C and the virtual camera (not illustrated) move according to a manual operation, and the current time pointer 136b on the time line 136a is displaced at a distance corresponding to the elapsed time.

The game screen in FIG. 12(A) includes the highlight scene mark 136d representing the decided highlight scene, and when the A button 82d is pushed again, the display manner (color, shape, etc.) of the "A" button is first changed as shown in FIG. 12(A), and the highlight scene mark 136c representing the undecided highlight scene is further displayed at a position indicated by the current time pointer 136b on the time line 136a as shown in FIG. 12(B). Accordingly, two kinds of the highlight scene marks 136c and 136d consequently exist on the time line 136a.

Thereafter, when a highlight scene re-recording operation is further performed, the position of the highlight scene mark 136c representing the undecided highlight scene is changed (the existing highlight scene mark 136c disappears, and a new highlight scene mark 136c appears at the position of the current time pointer 136b). On the other hand, when a highlight scene storing operation is performed, the highlight scene mark 136d representing the decided highlight scene disappears, and the highlight scene mark 136c representing the undecided highlight scene is changed to the highlight scene mark 136d representing the decided highlight scene.

Figure 13:
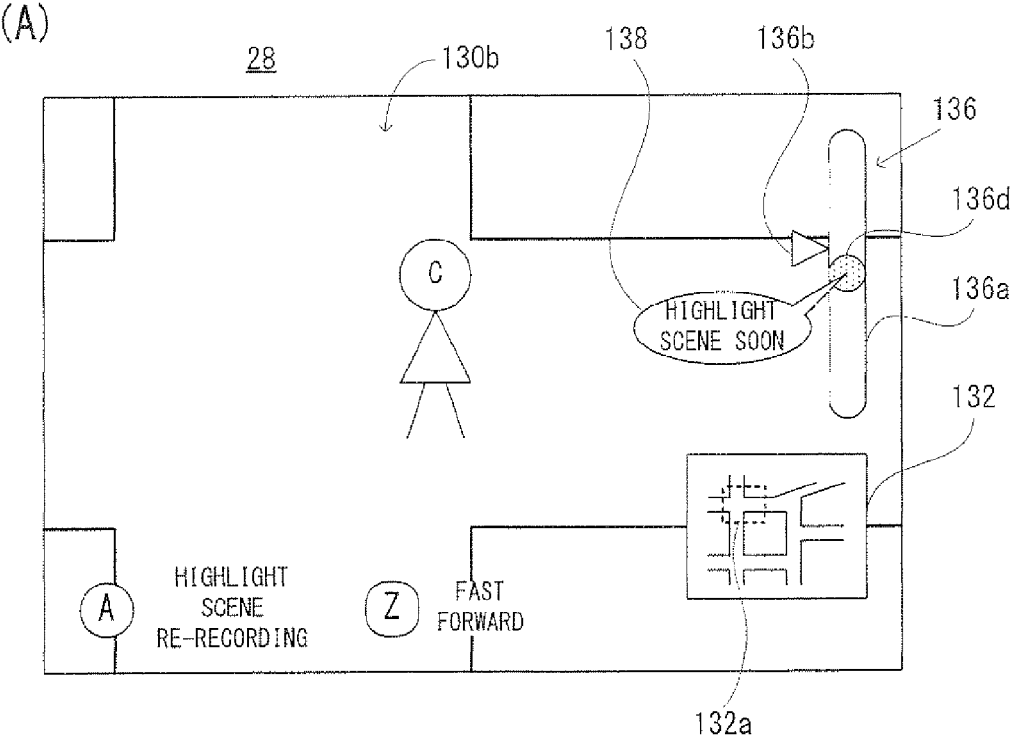
FIG. 13 is an illustrative view how the game screen is changed at a time of the highlight scene during replaying.
Figure 13:
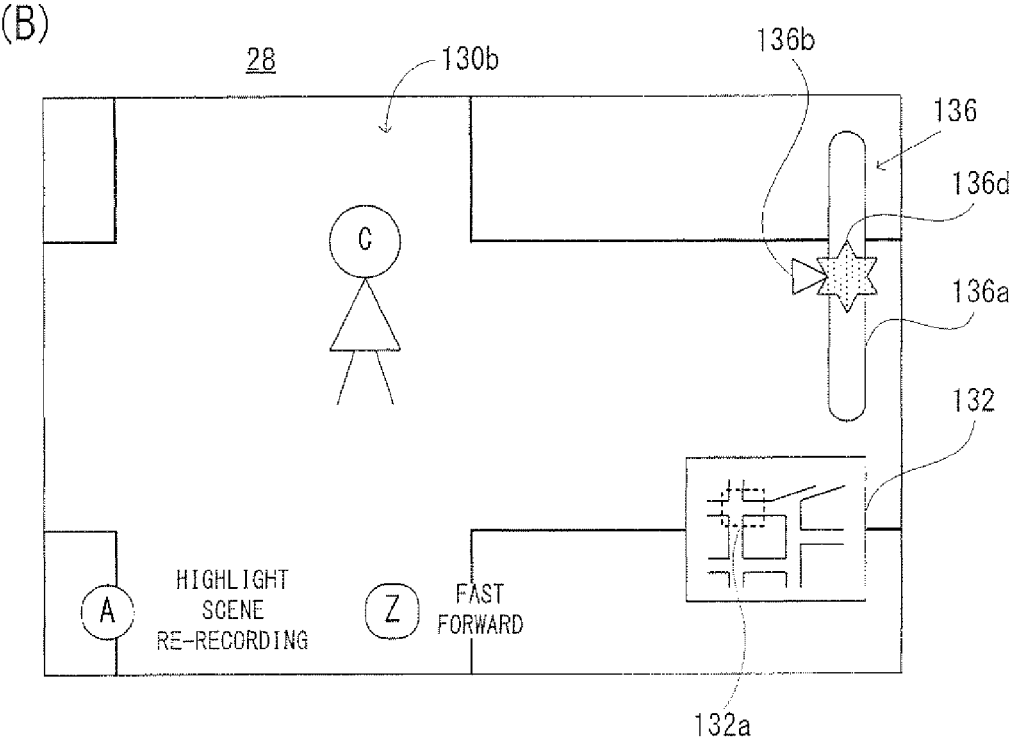

FIG. 13 is an illustrative view showing how the game screen changes at a timing of a highlight scene during replaying, and FIG. 13(A) shows a screen when the highlight scene approaches and FIG. 13(B) shows a screen when the highlight scene arrives. Before the highlight scene by a predetermined time, five seconds, for example, an announcement message 138 "highlight scene soon", for example, is first displayed as shown in FIG. 13(A), and when the current time pointer 136b then arrives at the highlight scene mark 136d as shown in FIG. 13(B), the announcement message 138 disappears, and the highlight scene mark 136d lights up (shape, color, brightness, etc. change). The lighting state continues 5 seconds, for example. Here, in another embodiment, the time to the highlight scene may be described in the announcement message 138, and the time may be counted down.

Figure 14:
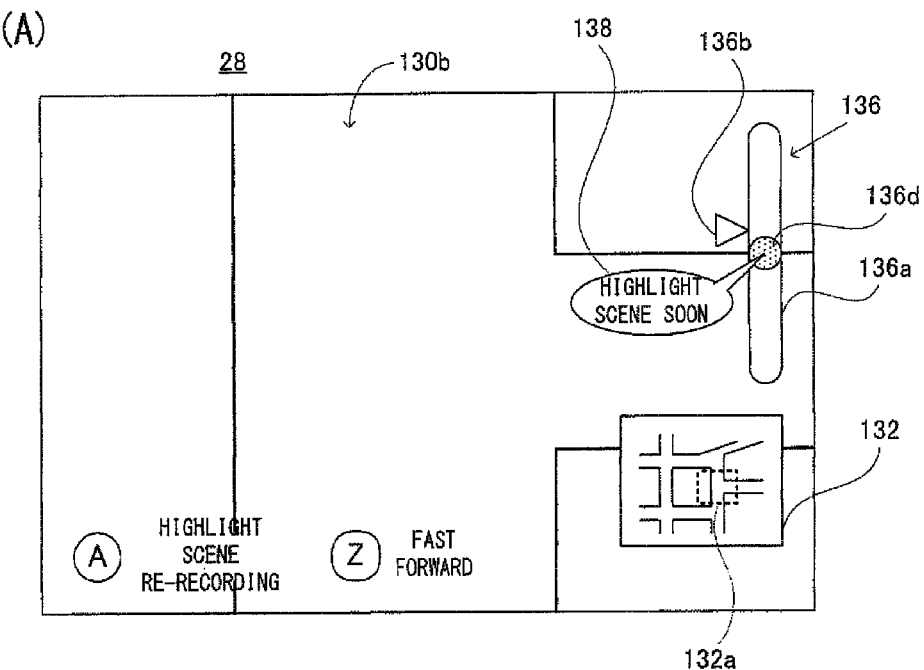
FIG. 14 is an illustrative view showing how the game screen is changed when the timing of the highlight scene approaches in a state that a viewpoint of the camera is away from a highlight scene position.
Figure 14:
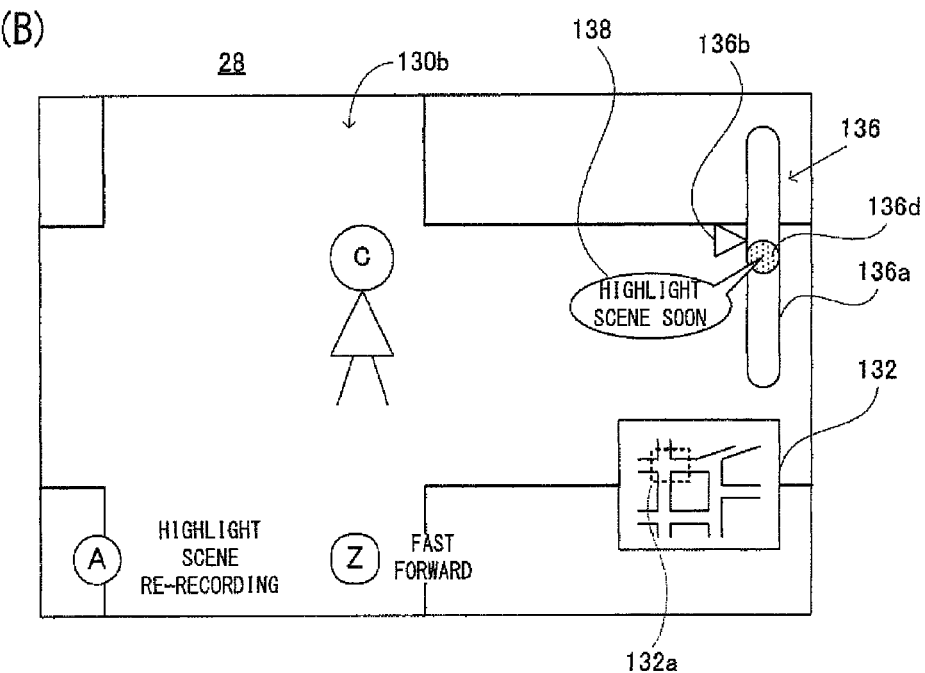

FIG. 14 is an illustrative view showing how the game screen changes when the time of the highlight scene approaches in a state that the viewpoint of the camera is away from the position of the highlight scene. FIG. 14(A) is a screen (five seconds before the highlight scene) similar to FIG. 13(A), and after the lapse of two seconds from here (that is, three seconds before the highlight scene), the viewpoint of the camera is forcedly moved to the place of highlight scene as shown in FIG. 14(B).

A detailed explanation of the game processing is made by means of a memory map in FIG. 15 and flowcharts in FIG. 16-FIG. 20 below. When the game is played, a program memory area 70 and a data memory area 78 are formed in the internal memory 42e and/or the external memory 46 as shown in FIG. 15, and in the program memory area 70, a game program 72, an input/output & communication controlling program 74, an AI program 76, etc. are stored.

The game program 72 is software for implementing the game by controlling the entire hardware (see FIG. 2) via the CPU 40, and corresponds to the flowcharts shown in FIG. 16-FIG. 20. The input/output & communication controlling program 74 is software for mainly controlling an input from the controller 14 and an output to the monitor 28 via the input-output processor 42a, mainly performing a data communication with another game apparatus 12A and the server 124 by means of the wireless communication module 50 over the network 122, and is utilized by the game program 72. The AI program 76 is software for allowing the computer to play a game in place of the player, and is utilized by the game program 72.

The data memory area 78 includes a mode information area 80, an operation information area 82, a frame image area 84, a frame number area 86, a viewpoint coordinate area 88, a replay data area 90, a current time pointer information area 92, a highlight scene information area 94, etc. The mode information area 80 stores mode information indicating a mode which is currently being selected. The operation information area 82 stores operation information indicating a game operation by the controller 14 immediately before. The frame image area 84 stores a current frame image. The frame number area 86 stores a current frame number. The viewpoint coordinate area 88 stores current viewpoint coordinates. The replay data area 90 stores replay data indicating a game operation history. The current time pointer information area 92 stores current time pointer information indicating a current display position of the current time pointer 136b. The highlight scene information area 94 stores highlight scene information indicating the position of the highlight scene in association with the replay data. The highlight scene information, here, includes variables VN and VC respectively indicating a temporal position and a spatial position of a highlight scene.

Figure 15:
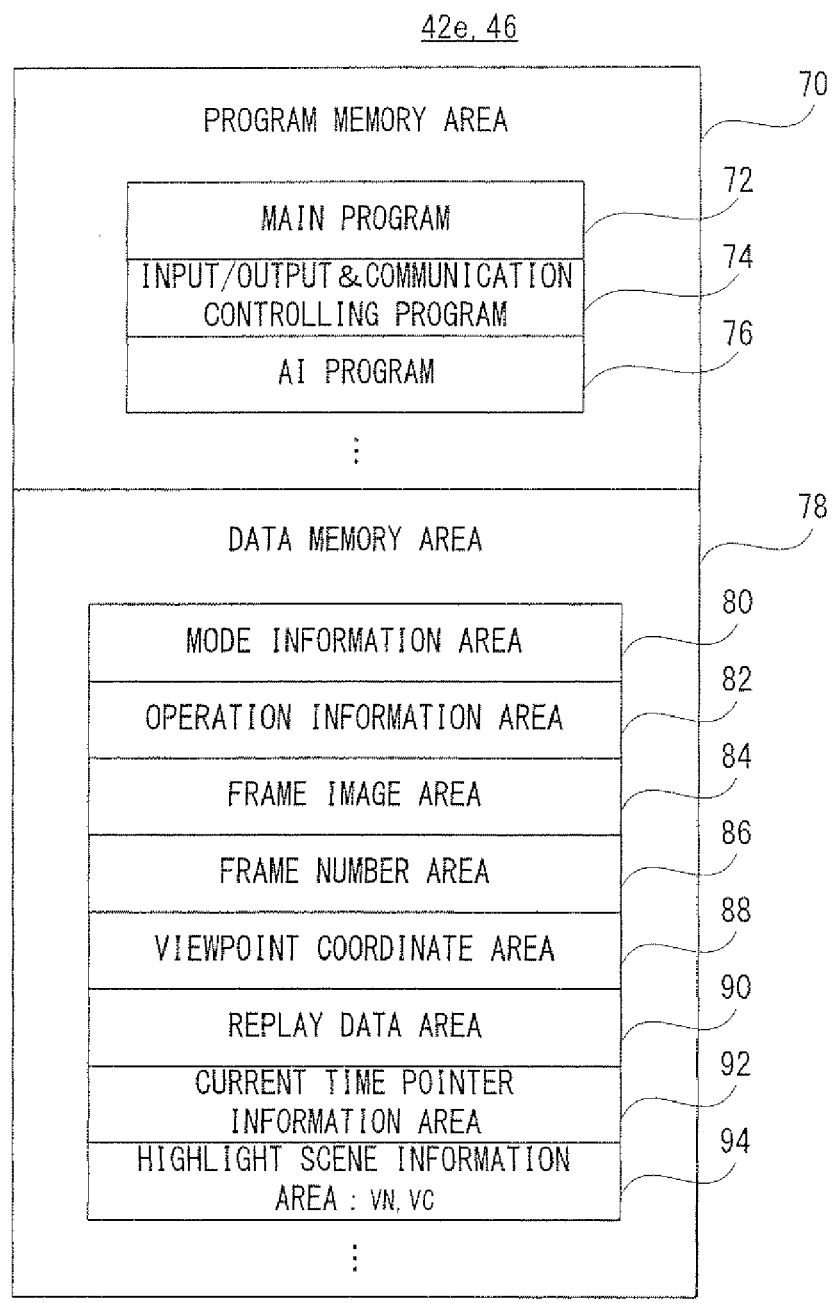
FIG. 15 is an illustrative view showing a part of a memory map.

The CPU 40 executes the game processing according to the flowcharts shown in FIG. 16-FIG. 20 on the basis of the programs and the data shown in the memory map of FIG. 15. Referring to FIG. 15, mode information indicating any one of a play mode, a replay mode I, communication mode and a replay mode II is stored in the mode information area 80 at the beginning of the game.

Although illustration is omitted, in parallel with the game process in FIG. 16-FIG. 20, processing of updating the information in the operation information area 82 every game operation by the controller 14 and processing of updating the information in the mode information area 80 in response to a mode changing operation by the controller 14 are executed by the input/output & communication controlling program 74.

Figure 16:
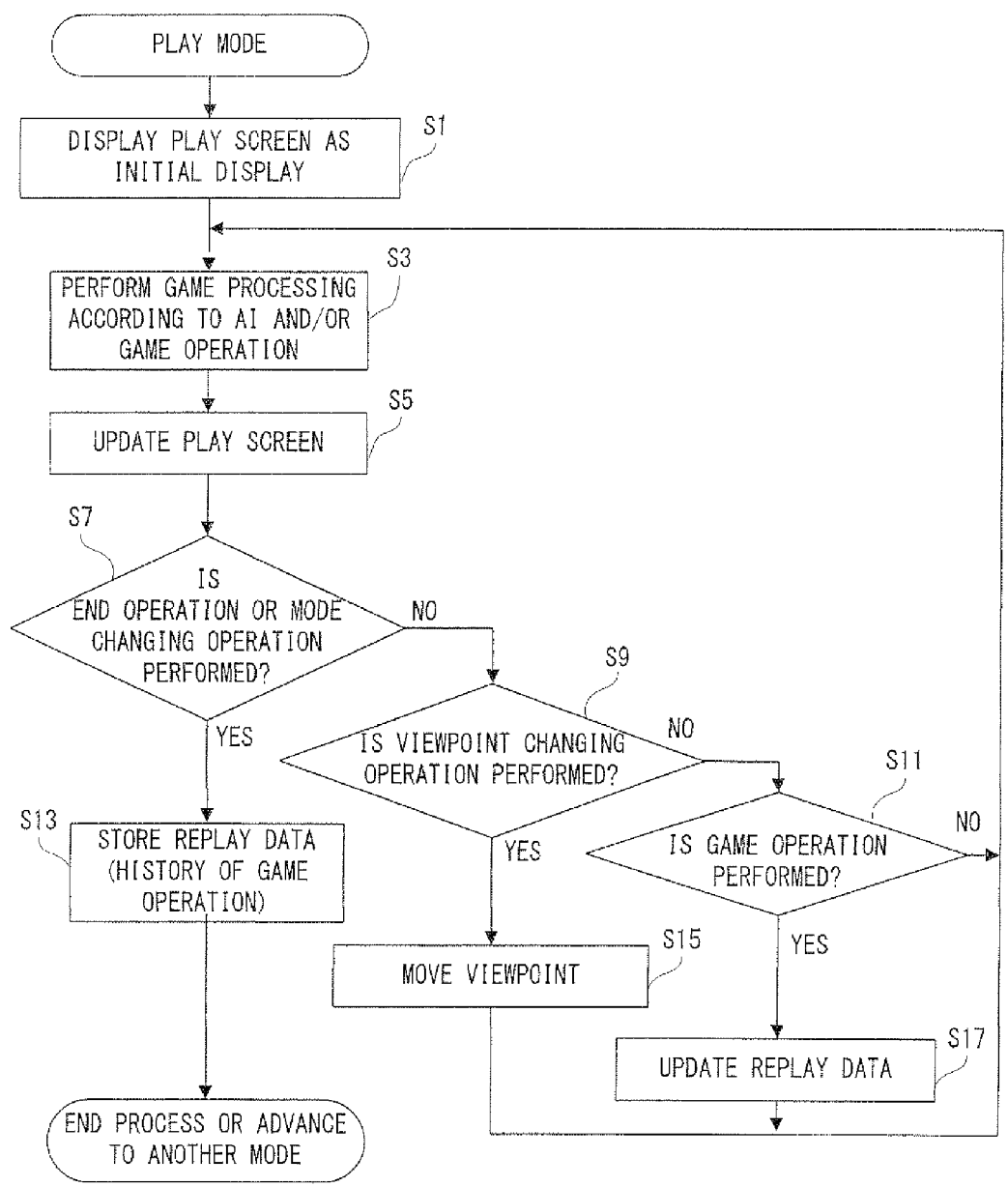
FIG. 16 is a flowchart showing a part of an operation by a CPU.

In a case that the mode information indicates the play mode, the game process advances according to the flowchart shown in FIG. 16. Referring to FIG. 16, the CPU 40 first displays a play screen on the monitor 28 as an initial display (see FIG. 10(A)) in a step S1, and game processing, such as movements of characters and a battle is executed by utilizing the AI program 76 and/or according to the game operation (on the basis of the information in the operation information area 82) in a step S3. Next, in a step S5, the play screen is updated by writing a frame image after the game processing to the frame image area 84, and writing a next frame number to the frame number area 85.

Next, in steps S7-S11, it is determined whether or not a specific operation is performed on the basis of the information in the operation information area 82. More specifically, in the step S7, it is determined whether an end operation or a mode changing operation is performed, in the step S9, it is determined whether or not a viewpoint changing operation is performed, and it is determined whether or not a game operation is performed in the step S11.

If "YES" in the step S7, the process shifts to a step S13 to store the data (game operation history) in the replay data area 90 in the flash memory 44 and/or the memory card 38, and then, the game process is to be ended, or shifted to another mode. If "YES" in the step S9, the process shifts to a step S15 to move the viewpoint of the virtual camera by updating the coordinates in the viewpoint coordinate area 88, and then, the process returns to the step S3. If "YES" in the step S11, the process shifts to a step S17 to update the data in the replay data area 90, and then, the process returns to the step S3.

Figure 17:
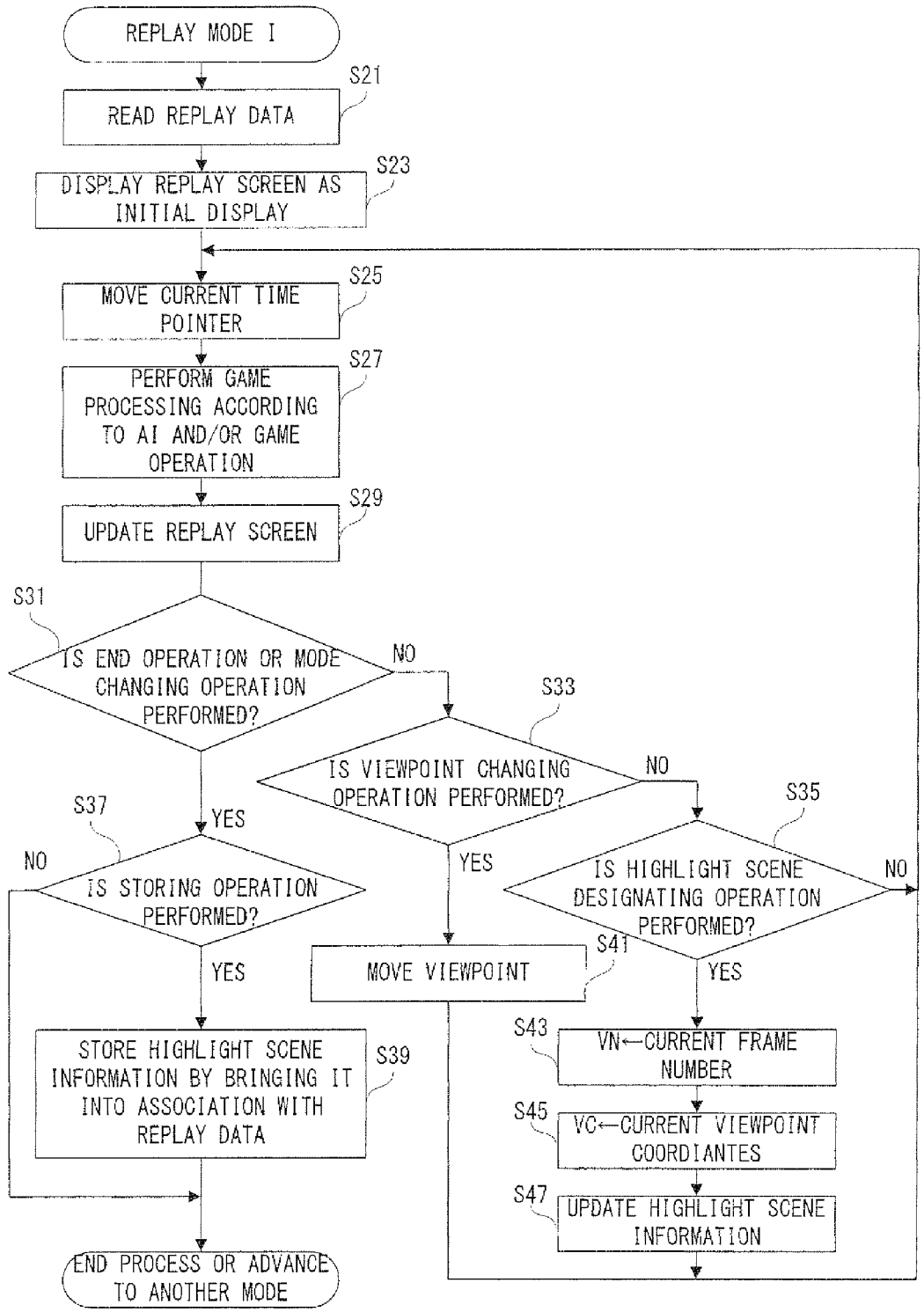
FIG. 17 is a flowchart showing another part of the operation by the CPU.

In a case that the mode information indicates the replay mode I, the game process advances according to the flowchart shown in FIG. 17. Referring to FIG. 17, the CPU 40 first reads the replay data from the flash memory 44 and/or the memory card 38 to the replay data area 90 in a step S21, and display a replay image on the monitor 28 as an initial screen in a step S23 (see FIG. 10(B)).

Next, in a step S25, by updating the information in the current time pointer information area 92, the current time pointer 136b is moved on the replay screen. In a step S27, game processing such as movements of characters and a battle is executed by utilizing the AI program 76 and/or according to the game operation. In a step S29, the play screen is updated by writing a frame image after the game processing to the frame image area 84, and writing a next frame number to the frame number area 85.

Next, in steps S31-S35, it is determined whether or not a specific operation is performed on the basis of the information in the operation information area 82. More specifically, in the step S31, it is determined whether or not an end operation or a mode changing operation is performed, in the step S33, it is determined whether or not a viewpoint changing operation is performed, and in the step S35, it is determined whether or not a highlight scene designating operation is performed.

If "YES" in the step S31, the process shifts to a step S37 to determine whether or not a storing operation is further performed after the end operation or the mode changing operation on the basis of the information in the operation information area 82, and if "NO", the game process is directly ended or is shifted to another mode. If "YES" in the step S37, the highlight scene positional information including the variables VN and VC is stored in the flash memory 44 and/or the memory card 38 by being brought into association with the replay data in a step S39, and then, the game processing is ended or is shifted to another mode.

If "YES" in the step S33, the process shifts to a step S41 to move the viewpoint of the virtual camera by updating the coordinates in the viewpoint coordinate area 88, and then, the process returns to the step S25. If "YES" in the step S35, the current frame number, that is, the number in the frame number area 86 is set to the variable VN in a step S43, and the current viewpoint coordinates, that is, the coordinates in the viewpoint coordinate area 88 is set to the variable VC in a step S45. Then, in a step S47, by writing the highlight scene information including these two variables VN and VC to the highlight scene information area 94, the highlight scene information is updated, and then the process returns to the step S25.

Figure 18:
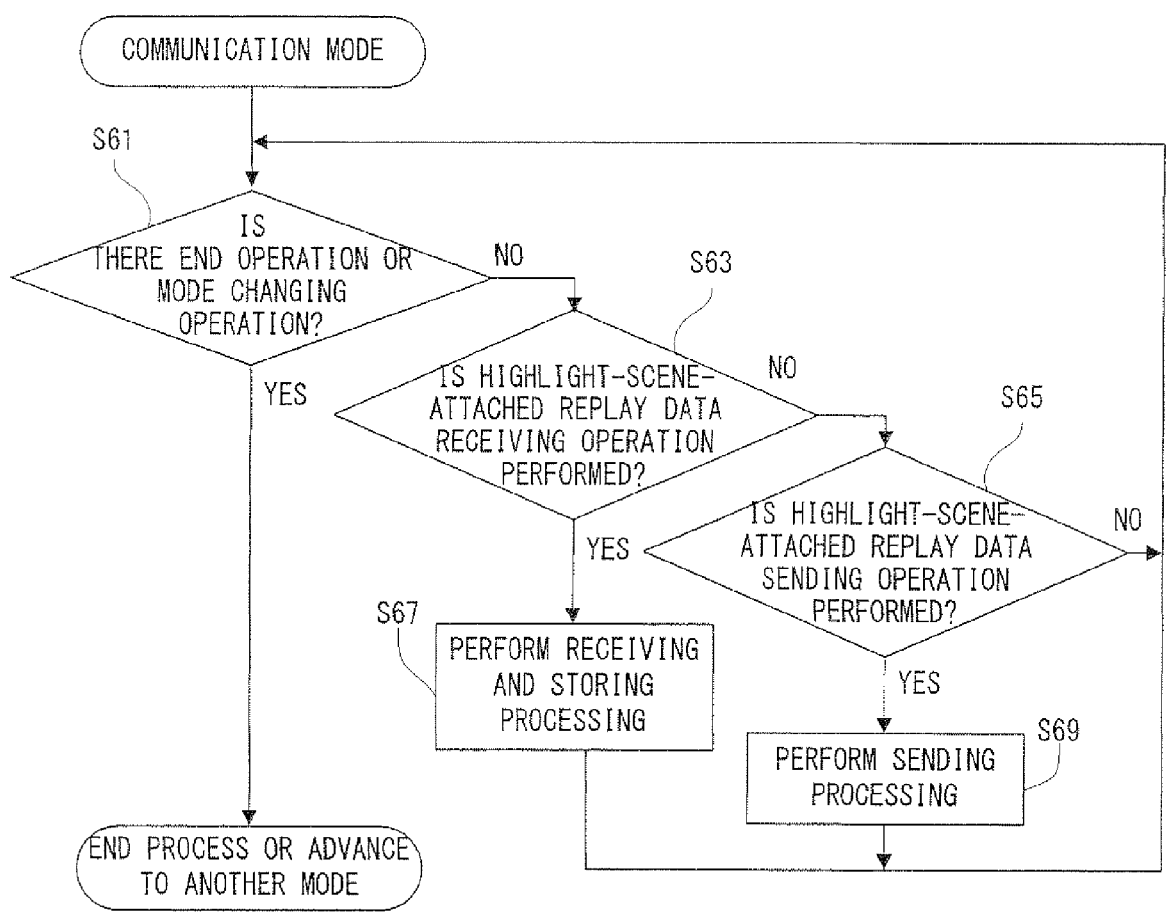
FIG. 18 is a flowchart showing a still another part of the operation by the CPU.

When the mode information indicates the communication mode, the game process advances according to the flowchart shown in FIG. 18. Referring to FIG. 18, the CPU 40 determines whether or not a specific operation is performed on the basis of the information in the operation information area 82 in steps S61-S65. More specifically, it is determined whether or not an end operation or a mode changing operation is performed in the step S61, it is determined whether or not a highlight-scene-attached replay data receiving operation is performed in the step S63, and it is determined whether or not a highlight-scene-attached replay data sending operation is performed in the step S65.

If "YES" in the step S61, the game process is ended or is shifted to another mode. If "YES" in the step S63, the process shifts to a step S67 to receive highlight-scene-attached replay data from another game apparatus 12A by utilizing the input/output & communication controlling program 74, and stores the received highlight scene attached replay data in the flash memory 44 and/or the memory card 38. Then, the process returns to the step S61. If "YES" in the step S65, the process shifts to a step S69 to send the highlight-scene-attached replay data stored in the flash memory. 44 and/or the memory card 38 by utilizing the input/output & communication controlling program 74 to this another game apparatus, and then, the process returns to the step S61.

Figure 19:
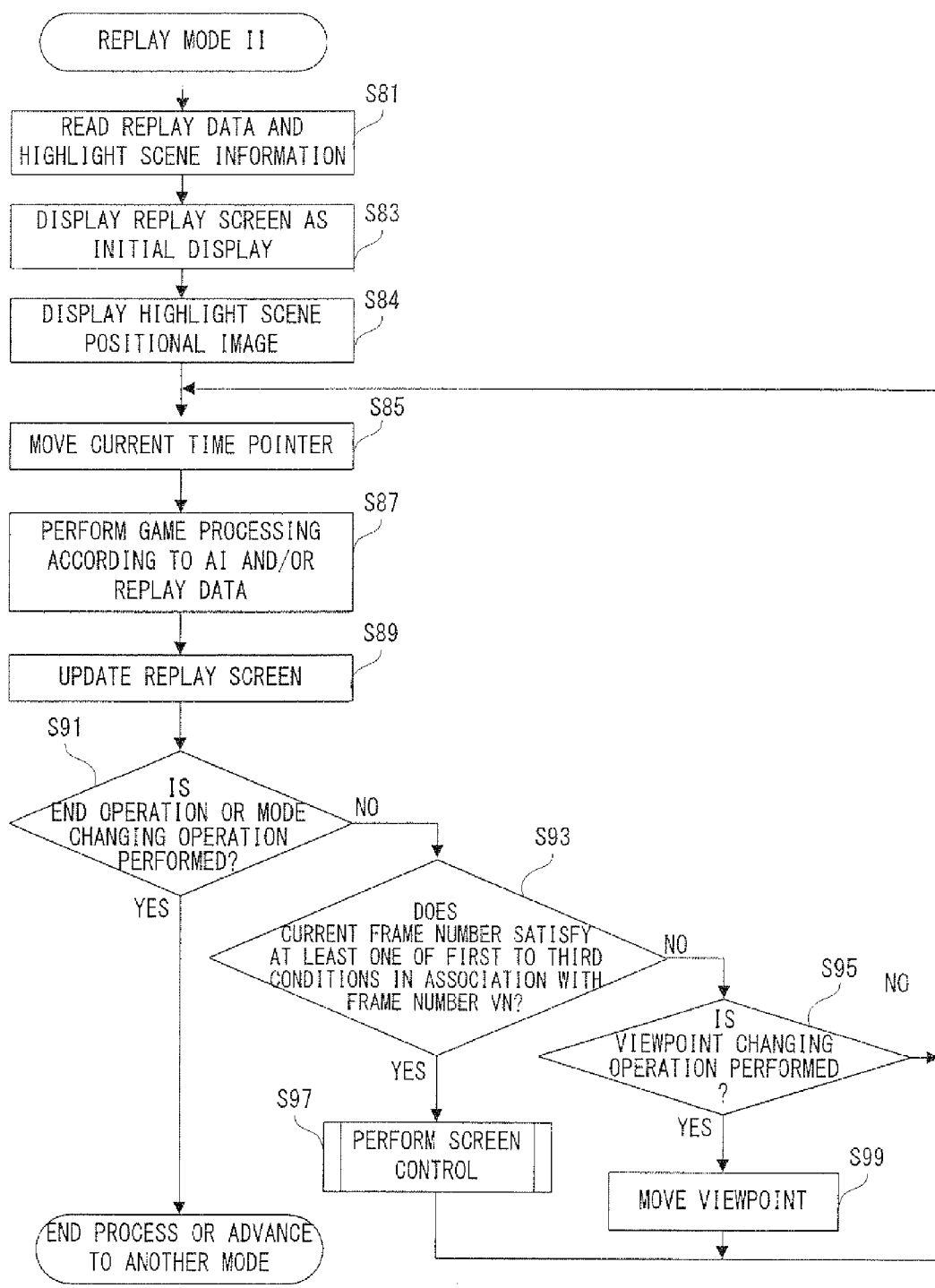
FIG. 19 is a flowchart showing a further part of the operation by the CPU.

In a case that the mode information indicates the replay mode II, the game process advances according to the flowchart shown in FIG. 19. Referring to FIG. 19, the CPU 40 first reads the replay data and the highlight scene positional information from the flash memory 44 and/or the memory card 38 to the replay data area 90 in a step S81, displays a replay screen on the monitor 28 as an initial display in a step S83, and further displays the time-line image 136 on the monitor 28 in a step S84 (see FIG. 10(B)).

Next, in a step S85, by updating the information in the current time pointer information area 92, the current time pointer 136b is moved on the replay screen. In a step S87, game processing, such as movements of characters and a battle is executed by utilizing the AI program 76 and/or according to the game operation. In a step S89, the play screen is updated by writing a frame image after the game processing to the frame image area 84, and writing a next frame number to the frame number area 85.

Next, in steps S91-S95, it is determined whether or not a specific operation is performed on the basis of the information in the operation information area 82, and it is determined whether or not the current frame number satisfies a specific condition on the basis of the information in the frame number area 86 and the information in the highlight scene information area. More specifically, it is determined whether or not an end operation or a mode changing operation is performed in the step S91, it is determined whether or not the current frame number satisfies at least any one of the first-third conditions (described later) in association with the variable VN in the step S93, and it is determined whether or not a viewpoint changing operation is performed in the step S95.

If "YES" in the step S91, the game processing is ended or shifted to another mode. If "YES" in the step S93, the process shifts to a step S97 to perform a screen control (see FIG. 19: described later) in order to display the highlight scene, and then, the process returns to the step S85. If "YES" in the step S95, the process shifts to a step S99 to move the viewpoint of the virtual camera by updating the coordinates of the viewpoint coordinate area 88, and then, the process returns to the step S85.

Here, the first-third conditions in associated with the aforementioned variable VN are explained in detail. The first condition is a condition for determining whether or not the current time is included in a highlight scene announcement inserting period, and is defined as "VN−300≦current frame number<VN", for example. According to this definition, the highlight scene announcement inserting period is the period of 300 frames (five seconds if it is converted to 60 fps) directly before the highlight scene. The second condition is a condition for determining whether or not the current time is a timing of performing a forced movement of the viewpoint, and is defined as "VN−180=current frame number", for example. According to this definition, the timing of performing the forced movement of the viewpoint is 180 frames before the highlight scene (3 seconds before). The third condition is a condition for determining whether or not the current time is included in the highlight scene mark lighting period, and is defined as "VN≦current frame number≦VN+299", for example. According to this definition, the highlight scene mark lighting period is the period of 300 frames (5 seconds) after the highlight scene. In this case, as a result of the second condition in addition to the first condition being satisfied 180 frames before the highlight scene, the viewpoint is forcedly moved in a state that the highlight scene announcement is displayed. Alternatively, in another example, assuming that the first condition is "VN−300≦current frame number <VN−120", and the second condition is "VN−120=current frame number", the viewpoint may be forcedly moved after the highlight scene announcing display is ended. In a still another embodiment, the condition in association with the variable VN is any one or two of the first to the third conditions, and conditions other than these may be added.

Figure 20:
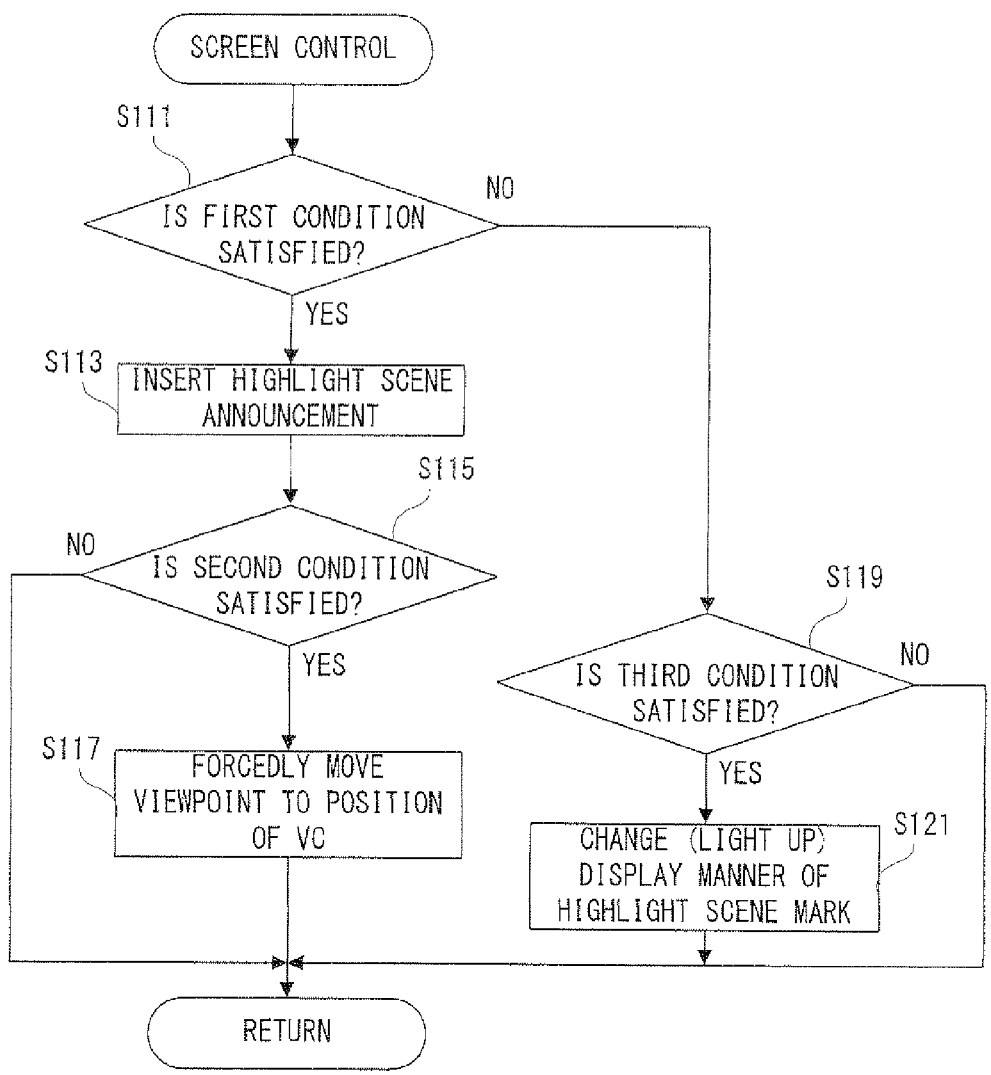
FIG. 20 is a flowchart showing another part of the operation by the CPU.

The aforementioned screen control in the step S97 advances according to a subroutine shown in FIG. 20 in detail. Referring to FIG. 20, the CPU 40 first determines whether or not the first condition is satisfied in a step S111, and if "YES", the process proceeds to a step S113. In the step S113, a drawing to the frame image area 86 is executed, and a highlight scene announcement (announcement message 138) is inserted to the replay screen. Next, it is determined whether or not the second condition is satisfied in a step S115, and if "YES", the process proceeds to a step S117. In the step S117, by updating the coordinates in the viewpoint coordinate area 88 on the basis of the highlight scene information, the viewpoint is forcedly moved to the position indicated by the variable VC. Thereafter, the process is restored to the routine at the hierarchical upper level.

On the other hand, if "NO" in the step S111, the process shifts to a step S119 to determine whether or not the third condition is satisfied, and if "NO", the process is restored to the routine at the hierarchical upper level. If "YES" in the step S119, the process proceeds to a step S121 to change (light up) the display manner of the highlight scene mark, and then, the process is restored to the routine at the hierarchical upper level. Here, the highlight scene mark lighting state continues for 5 seconds, for example, and returns to a light-out state.

As can be understood from the above description, in this embodiment, the game apparatus 12 stores a history in relation to a game operation of the player as replay data in the flash memory 44 and/or the memory card 38, and displays a replay image on the monitor 28 on the basis of the stored replay data. The CPU 40 of the game apparatus 12 creates highlight scene positional information indicating at least a temporal position of the highlight scene in the replay image on the basis of a highlight scene position designating operation by the player (S35, S43, S45), stores the created highlight scene positional information in the flash memory 44 and/or the memory card 38 by bringing it into associated with the replay data (S39), and displays the time-line image 136 indicating the temporal position of the highlight scene in the replay image on the basis of the highlight scene positional information on the monitor 28 when the replay image is displayed on the screen (S84).

Thus, by displaying the highlight scene positional image such as the time-line image 136 together with the replay image, it is possible to make the player perceive at least the temporal position of the highlight scene. As a result, it is possible to reduce a possibility that the opponent who receives the replay data misses the highlight scene.

Additionally, only one highlight scene is designed in the aforementioned embodiment, but a plurality of highlight scenes may be designated in another embodiment.

Furthermore, in the above-described embodiment, the virtual camera is a free camera moving in accordance with a camera operation by the user, but in another embodiment, this may be a following camera which moves so as to follow a specific character or group. In this case, the user performs an operation of designating a character or a group as an object to be followed before playing or during playing, and the CPU 40 moves the virtual camera so as to follow the designated character or group.

More specifically, in the aforementioned embodiment (in the free camera mode), if a next change is made, the following camera mode is implemented. In the viewpoint coordinate area 88 (see FIG. 15), an ID of the character or the group as an object to be followed at a current time is stored in place of the viewpoint coordinates at the current time. Accordingly, the viewpoint coordinates described in the replay data is also changed to the ID of the character or the group. In the steps S9, S33 and S95 (see FIG. 16, FIG. 17 and FIG. 19), in place of the presence or absence of a viewpoint changing operation, a presence or absence of an operation of changing an object to be followed is determined. In the step S45 (see FIG. 17), in place of the viewpoint coordinates at a time when a highlight scene designating operation is performed, the ID of the character or group as the object to be followed when the highlight scene designating operation is performed is set to the variable VC (see FIG. 15).

The above description is made on the game apparatus 12, but this invention can be applied to any game apparatuses capable of storing a history in relation to the game operation by the player in a memory as replay data, and displaying the replay image on the screen on the basis of the replay data.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A non-transitory recording medium recording a game program, wherein said game program causes a computer of a game apparatus to store a history in relation to a game operation by a player as replay data in a memory and to display a replay image on the basis of said replay data on a screen, said game program causing said computer to execute instructions comprising:

creating highlight scene positional information indicating at least a temporal position of a highlight scene and a spatial position of the highlight scene in said replay image on the basis of a highlight scene position designating operation by said player, said replay image is an image when at least a part of a virtual game space is viewed from an arbitrary viewpoint;

storing the created highlight scene positional information by bringing it into association with said replay data in said memory;

displaying a highlight scene positional image indicating a temporal position of the highlight scene in said replay image on said screen on the basis of said highlight scene positional information when said replay image is displayed on said screen; and moving said viewpoint to the position of the highlight scene before start of the highlight scene on the basis of said highlight scene positional information.

2. The non-transitory recording medium recording a game program according to claim 1, wherein
the temporal position of said highlight scene is indicated by frame specifying information of said replay image,
said highlight scene position designating operation is a button push operation performed at an arbitrary timing while said replay image is displayed on said screen, and
the frame specifying information is described at a time when said button push operation is performed in said highlight scene positional information.

3. The non-transitory recording medium recording a game program according to claim 1, wherein
the temporal position and the spatial position of said highlight scene are respectively indicated by frame specifying information and viewpoint specifying information of said replay image,
said highlight scene position designating operation is a button push operation performed at an arbitrary timing while said replay image is displayed on said screen, and
the frame specifying information and the viewpoint specifying information are described at a time when said button push operation is performed in said highlight scene positional information.

4. The non-transitory recording medium recording a game program according to claim 2, wherein
said highlight scene positional image includes a time line corresponding to a displaying period of said replay image and a highlight scene mark indicating a temporal position of said highlight scene by a position on said time line.

5. The non-transitory recording medium recording a game program according to claim 4, wherein
said highlight scene positional image further includes a current time pointer indicating a current time by a position on said time line.

6. The non-transitory recording medium recording a game program according to claim 1, wherein
said game program causes said computer to further execute instructions comprising displaying an announcement image to announce a start of the highlight scene on said screen before the current time arrives at the temporal position of said highlight scene.

7. The non-transitory recording medium recording a game program according to claim 1, wherein
said game program causes said computer to further execute changing a manner of said highlight scene mark in response to the current time arriving at the temporal position of said highlight scene.

8. The non-transitory recording medium recording a game program according to claim 4, wherein
said memory includes a temporary memory area and a storage area,
the highlight scene positional information created by said creating means is stored in said temporary memory area, and the highlight scene positional information stored in said temporary memory area is stored in said storage area in response to a storing operation by said user, and
a first highlight scene mark is displayed on the basis of the highlight scene positional information stored in said temporary memory area, and a second highlight scene mark is displayed on the basis of the highlight scene positional information stored in said storage area.

9. A game apparatus storing a history in relation to a game operation by a player as replay data in a memory and displaying a replay image on a screen on the basis of said replay data, comprising:
a creating unit for creating highlight scene positional information indicating at least a temporal position of a highlight scene and a spatial position of the highlight scene in said replay image on the basis of a highlight scene position designating operation by said player, said replay image is an image when at least a part of a virtual game space is viewed from an arbitrary viewpoint;
a storing unit for storing the highlight scene positional information created by said creating unit by bringing it into association with said replay data in said memory;
a highlight scene positional image displaying unit for displaying a highlight scene positional image indicating a temporal position of the highlight scene in said replay image on said screen on the basis of said highlight scene positional information when said replay image is displayed on said screen; and
a viewpoint moving unit for moving said viewpoint to the position of the highlight scene before start of the highlight scene on the basis of said highlight scene positional information.

10. A game system including a first game apparatus providing a history in relation to a game operation by a player as replay data and a second game apparatus displaying a replay image on a screen on the basis of the replay data received from said first game apparatus, wherein
said first game apparatus comprises:
a creating unit for creating highlight scene positional information indicating at least a temporal position of a highlight scene and a spatial position of the highlight scene in said replay image on the basis of a highlight scene position designating operation by said player, said replay image is an image when at least a part of a virtual game space is viewed from an arbitrary viewpoint; and
a providing unit for providing the highlight scene positional information created by said creating means to said second game apparatus by bringing it into association with said replay data, and
said second game apparatus comprises:
a receiving unit for receiving said highlight scene positional information provided from said first game apparatus by bringing it into association with said replay data,
a highlight scene positional image displaying unit for displaying a highlight scene positional image indicating a temporal position of the highlight scene in said replay image on said screen on the basis of said highlight scene positional information when said replay image is displayed on said screen, and
a viewpoint moving unit for moving said viewpoint to the position of the highlight scene before start of the highlight scene on the basis of said highlight scene positional information.

11. A method, implemented in an information processing apparatus having one or more processors, and for storing a history in relation to a game operation by a player as replay data in a memory and displaying a replay image on the basis of said replay data on a screen, the method comprising:
creating, via the one or more processors, highlight scene positional information indicating at least a temporal position of a highlight scene and a spatial position of the highlight scene in said replay image on the basis of a highlight scene position designating operation by said player, said replay image is an image when at least a part of a virtual game space is viewed from an arbitrary viewpoint;

storing the created highlight scene positional information by bringing it into association with said replay data in said memory;

displaying a highlight scene positional image indicating a temporal position of the highlight scene in said replay image on said screen on the basis of said highlight scene positional information when said replay image is displayed on said screen; and moving said viewpoint to the position of the highlight scene before start of the highlight scene on the basis of said highlight scene positional information.

\* \* \* \* \*